United States Patent
Tsuchiya et al.

(10) Patent No.: US 9,423,676 B2
(45) Date of Patent: Aug. 23, 2016

(54) LIGHTING UNIT AND IMAGE PROJECTOR

(71) Applicants: Satoshi Tsuchiya, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Naoyuki Ishikawa, Kanagawa (JP); Akihisa Mikawa, Kanagawa (JP)

(72) Inventors: Satoshi Tsuchiya, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Naoyuki Ishikawa, Kanagawa (JP); Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 14/302,905

(22) Filed: Jun. 12, 2014

(65) Prior Publication Data

US 2014/0375964 A1 Dec. 25, 2014

(30) Foreign Application Priority Data

Jun. 25, 2013 (JP) ................................. 2013-132449

(51) Int. Cl.
*G03B 21/16* (2006.01)
*H04N 9/31* (2006.01)
*G03B 33/08* (2006.01)
*G03B 21/20* (2006.01)
*G02B 26/00* (2006.01)

(52) U.S. Cl.
CPC ............. *G03B 21/16* (2013.01); *G02B 26/008* (2013.01); *G03B 21/206* (2013.01); *G03B 33/08* (2013.01); *H04N 9/3144* (2013.01)

(58) Field of Classification Search
CPC .... G03B 21/16; G03B 21/20; G03B 21/202; G03B 21/2026; H04N 9/3144; H04N 9/3141
USPC ............................ 353/84, 52, 57, 58, 60, 61
See application file for complete search history.

(56) References Cited

U.S. PATENT DOCUMENTS

| 8,182,096 | B2 * | 5/2012 | Kiser | G03B 21/16 165/86 |
|---|---|---|---|---|
| 2002/0003704 | A1 | 1/2002 | Ohmae et al. | |
| 2003/0098956 | A1 * | 5/2003 | Chang | H05K 7/20 353/52 |
| 2004/0095767 | A1 * | 5/2004 | Ohmae | F21S 10/007 362/293 |

(Continued)

FOREIGN PATENT DOCUMENTS

| EP | 1 750 456 A1 | 2/2007 |
|---|---|---|
| EP | 2 270 590 A1 | 1/2011 |

(Continued)

OTHER PUBLICATIONS

Extended European Search Report issued on Aug. 4, 2015 in the corresponding European Application No. 14172228.0.

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

A lighting unit and an image projector that cool a drive source that drives a color wheel favorably and prevents dust from collecting on the color wheel are provided. The lighting unit includes a color wheel that divides light from a light source into colors different from each other time-divisionally, a drive source that drives the color wheel such as a color motor, and an optical device that illuminates light that passes through the color wheel on an image generating device such as a DMD that generates a projection image. The lighting unit includes a cooling device that draws heat from the drive source to cool the drive source.

5 Claims, 21 Drawing Sheets

(56) References Cited

U.S. PATENT DOCUMENTS

| | | |
|---|---|---|
| 2007/0030458 A1 | 2/2007 | Kim |
| 2008/0074626 A1 | 3/2008 | Lu et al. |
| 2008/0079853 A1* | 4/2008 | Hwang .................. G03B 21/14 348/743 |
| 2009/0284148 A1 | 11/2009 | Iwanaga |
| 2010/0328627 A1 | 12/2010 | Miyazaki |
| 2012/0147331 A1 | 6/2012 | Miyazaki |
| 2012/0162753 A1 | 6/2012 | Tatsuno |
| 2013/0107225 A1 | 5/2013 | Miyazaki |
| 2013/0114045 A1 | 5/2013 | Fujioka et al. |

FOREIGN PATENT DOCUMENTS

| | | |
|---|---|---|
| JP | 2006-113276 | 4/2006 |
| JP | 2006-215431 | 8/2006 |
| JP | 2008-046195 | 2/2008 |
| JP | 2012-137622 | 7/2012 |
| JP | 2013-097340 | 5/2013 |

\* cited by examiner

LIGHTING UNIT AND IMAGE PROJECTOR

CROSS-REFERENCE TO RELATED APPLICATION

This patent application is based on and claims priority pursuant to 35 U.S.C. §119(a) to Japanese Patent Application No. 2013-132449, filed on Jun. 25, 2013 in the Japan Patent Office, the entire disclosure of which is hereby incorporated by reference herein.

BACKGROUND

1. Technical Field

The present invention relates to a lighting unit and an image projector.

2. Background Art

Conventionally, image projectors that include a lighting unit that time-divides light from a light source into different colors using a color wheel and direct R, G, and B colored light sequentially onto an image generating device and project light modulated by the image generating device onto projection surfaces such as screens, etc., using a projection optical system are known.

A problem with such projectors arises if the motor that drives the color wheel gets hot and it becomes impossible to drive the color wheel at predetermined speed. Accordingly, an image projector that circulates air through the motor and air-cools the motor has been proposed. In the conventional image projector, dust collects on the color wheel, degrading the quality of projection images by reducing the brightness of the projection images.

SUMMARY

An example embodiment of the present invention provides an improved lighting unit and an image projector that cool a drive source that drives a color wheel and prevents dust from collecting on the color wheel. The lighting unit includes a color wheel that time-divides light from a light source into different colors, a drive source that drives the color wheel, and an optical device that directs light that passes through the color wheel onto an image generating device such as a Digital Micro-mirror Device (DMD) that generates a projection image. The lighting unit includes a cooling device that draws heat from the drive source to cool the drive source.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
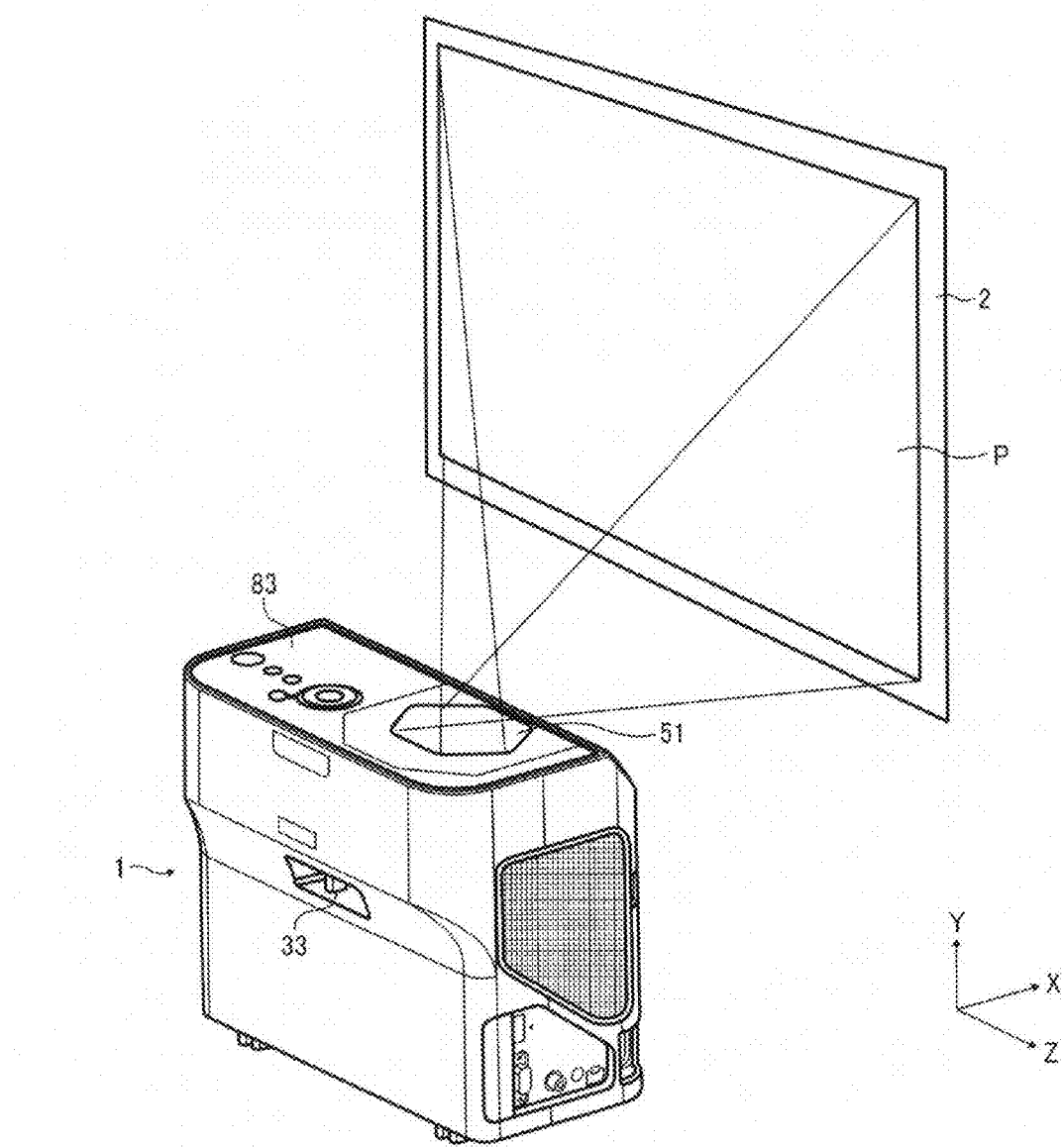
FIG. 1 is a perspective diagram illustrating an image projector as an embodiment of the present invention and a projection surface.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The inventors of the present invention discovered that dust floating around inside the apparatus moves toward the color motor by circulating air through the color motor. Since the color wheel placed close to the color motor described above rotates at high-speed, a low-pressure area surrounds the color wheel and part of the air for cooling the color motor flows into the color wheel. As a result, the dust that moves to the color motor along with the air that flows through the color motor is drawn into the color wheel, and the dust collects on the color wheel.

In the following embodiment, a lighting unit and an image projector that can cool a drive source that drives the color wheel and prevent dust from collecting on the color wheel is provided.

FIG. 1 is a perspective diagram illustrating an image projector 1 in this embodiment and a projection surface 2. In the following description, the normal direction of the projection surface 2 is considered as the x direction, the minor axis direction (horizontal direction) of the projection surface 2 is considered as the y direction, and the major axis direction (horizontal direction) of the projection surface 2 is considered as the z direction.

The image projector forms projection images based on image data input from personal computers and video cameras, etc., and projects the projection image P on the projection surface 2 such as screens, etc. In particular, liquid crystal projectors are improving brightness due to high-resolution liquid crystal panels and high efficiency of a light source (lamp) and becoming less expensive recently. In addition, small and lightweight image projectors 1 that adopt a Digital Micro-mirror Device (DMD) as a micro driving mirror device are becoming popular, and the image projectors 1 are widely used not only in offices and schools but also in homes.

The front-type projectors improve portability, and they are used at small meetings of several people. For these projectors, it is desirable not only that images be projectable on a larger screen but also that required projection space outside of the image projector be minimized. As described later, the image projector 1 in this embodiment is configured laying out a transparent optical system such as a projection lens, etc., parallel to the projection surface 2, reflecting a beam by the reflection mirror, and enlarging and projecting the beam on the projection surface 2 with a sculptured surface mirror. In this configuration, it is possible to downsize the upright optical engine unit.

A dustproof glass window 51 from which beam of a projection image P exits is mounted in the upper surface of the image projector 1, and the beam that exits from the dustproof glass window 51 is projected onto a projection surface 2 such as a screen. In addition, a control panel 83 for operating the image projector 1 by a user operation is mounted on the upper surface of the image projector 1. A focus lever 33 for focusing is mounted on the side surface of the image projector 1.

Figure 2A:
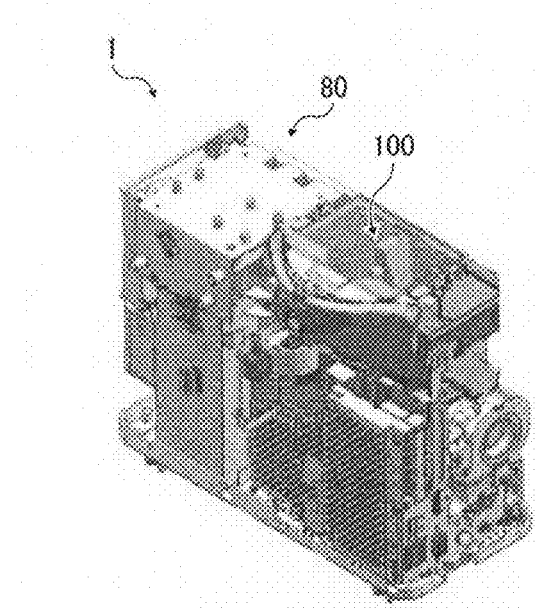
FIG. 2A is a perspective diagram illustrating an interior of the image projector from a front side in FIG. 1.
Figure 2B:
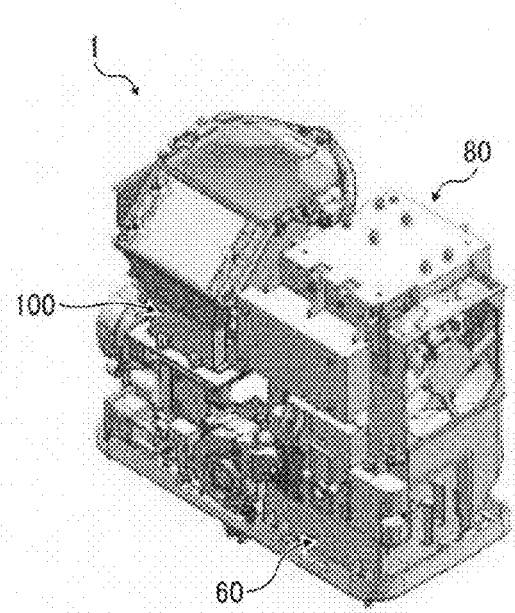
FIG. 2B is a perspective diagram illustrating the interior of the image projector viewed from a back side in FIG. 1.

FIGS. 2A and 2B are perspective diagrams illustrating the interior of the image projector 1 with the cover removed. FIG. 2A is a perspective diagram illustrating the interior of the image projector from a viewpoint of the front side in FIG. 1, and FIG. 2B is a perspective diagram illustrating the interior of the image projector viewed from the back side in FIG. 1.

Figure 3:
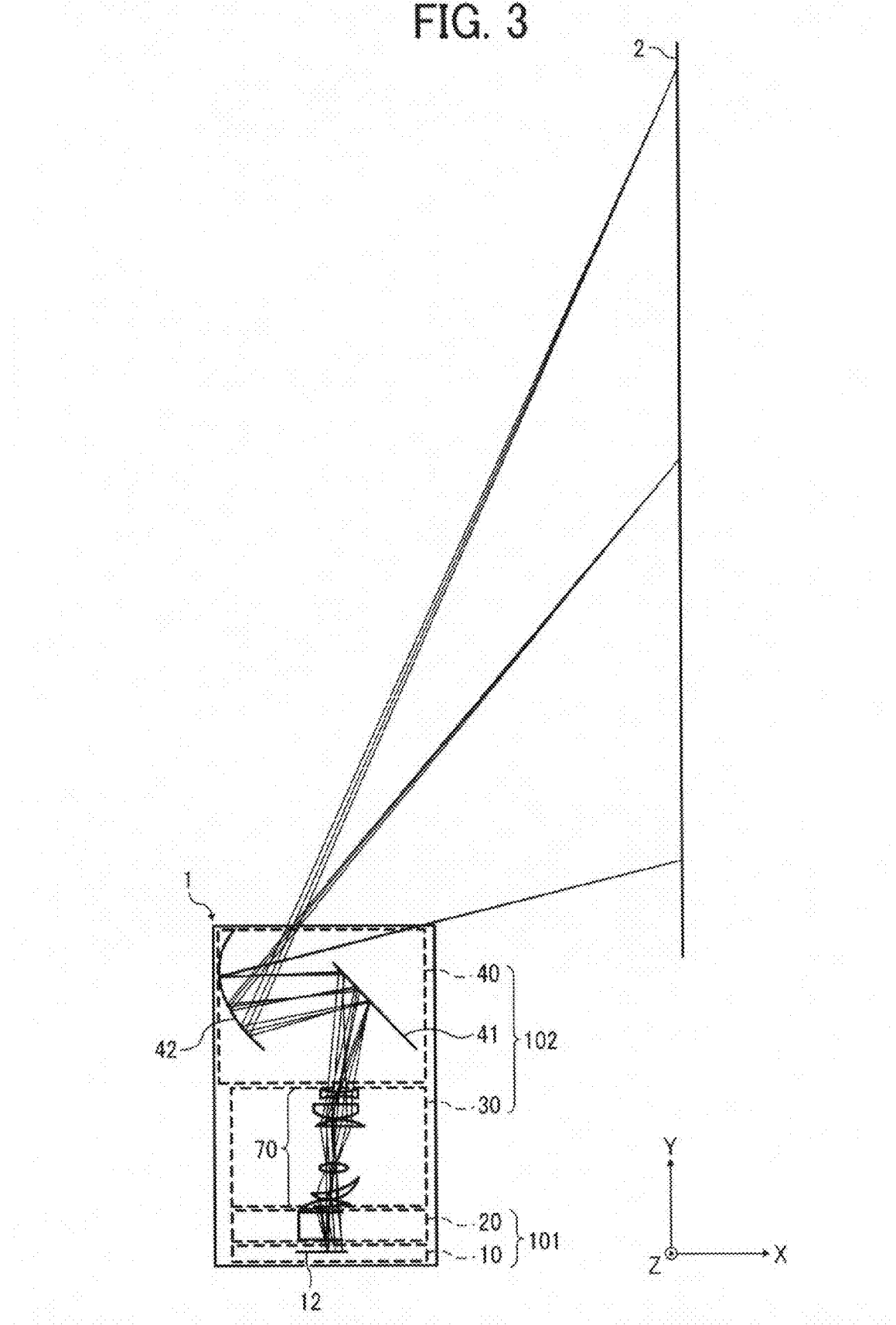
FIG. 3 is a diagram illustrating light paths from the image projector to the projection surface.

FIG. 3 is a diagram illustrating light path from the image projector 1 to the projection surface 2.

The image projector 1 includes an optical engine unit 100 and a light source unit 60 that includes a light source that generates white light. The optical engine unit 100 includes an image forming unit 101 that forms an image using the light from the light source and a projection optical unit 102 that projects beam of the image generated by the image forming unit 101 on the projection surface 2.

The image forming unit 101 includes a light modulator 10 that includes a DMD 12 as that includes multiple micro mirrors drivable to change the slope of the reflecting surface and a lighting unit 20 that reflects the light from the light source to the DMD 12. The projection optical unit 102 includes a first projection optical system 30 that includes a coaxial optical system 70 that has positive power and includes at least two transmissive refracting optical systems and a second projection optical system 40 that includes a reflecting mirror 41 and a curved mirror 42 that has positive power.

The lighting unit 20 illuminates the DMD 12 with the light from the light source and the DMD 12 generates an image by modulating the light emitted by the lighting unit 20. The light image generated by the DMD 12 is projected onto the projection surface 2 via the optical system 70 in the first projection optical system 30 and the reflecting mirror 41 and the curved mirror 42 in the second projection optical system 40.

Figure 4:
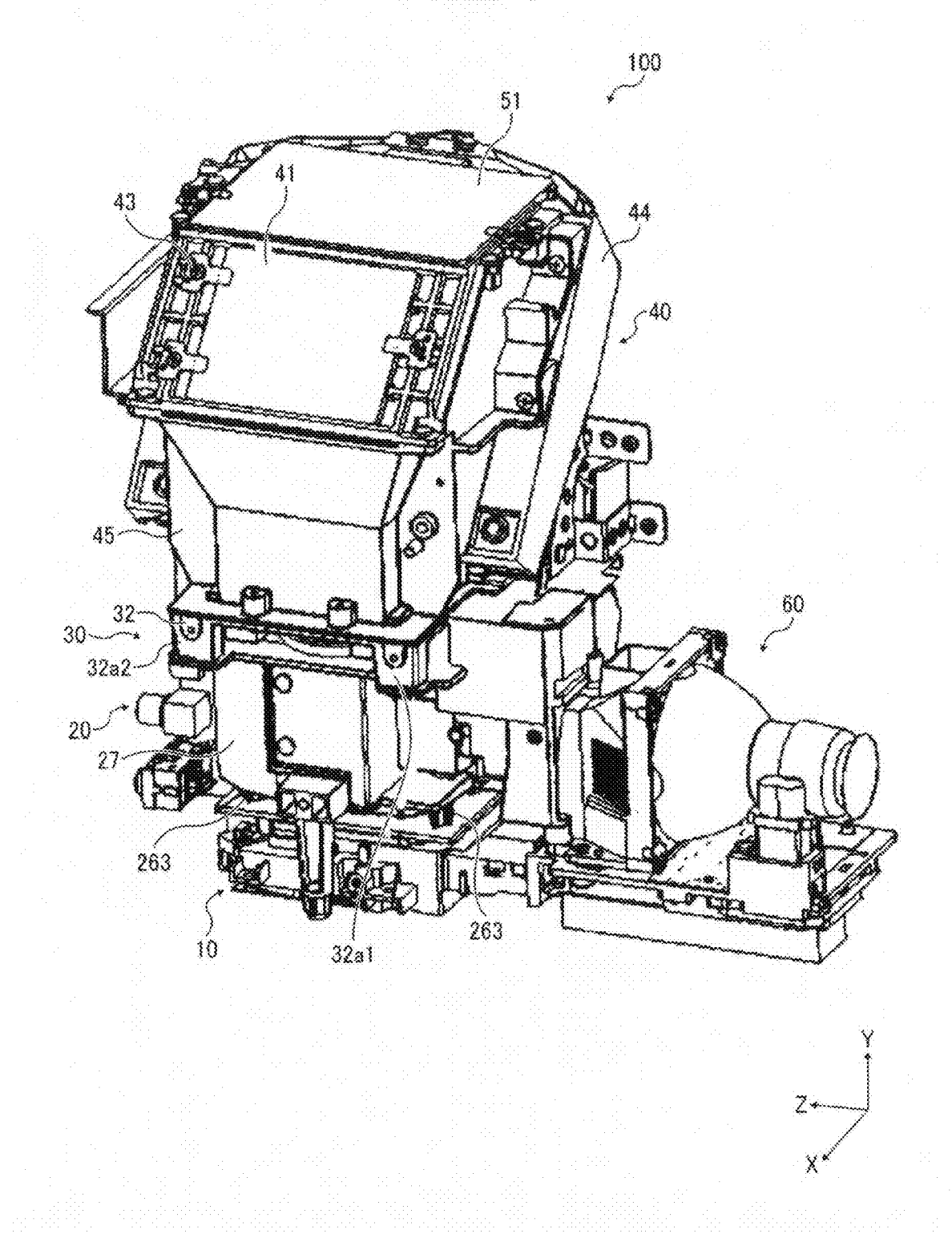
FIG. 4 is a perspective diagram illustrating an optical engine unit and a light source unit mounted inside the image projector.

FIG. 4 is a perspective diagram illustrating an optical engine unit and a light source unit mounted inside of the image projector 1.

As shown in FIG. 4, a light modulator 10, the lighting unit 20, the first optical unit 30, and the second optical unit 40 that comprise the optical engine unit 100 are placed alongside of the y direction in FIG. 4 among directions parallel to the projection surface and the field of the projection image. In addition, a light source unit 60 is mounted in the right side of the lighting unit 20 in FIG. 4. Symbols 32a1 and 32a2 in FIG. 4 indicate legs of a lens holder 32 in the first optical unit 30, and symbol 263 indicates a screw part to screw the light modulator 10 onto the lighting unit 20.

Figure 5:
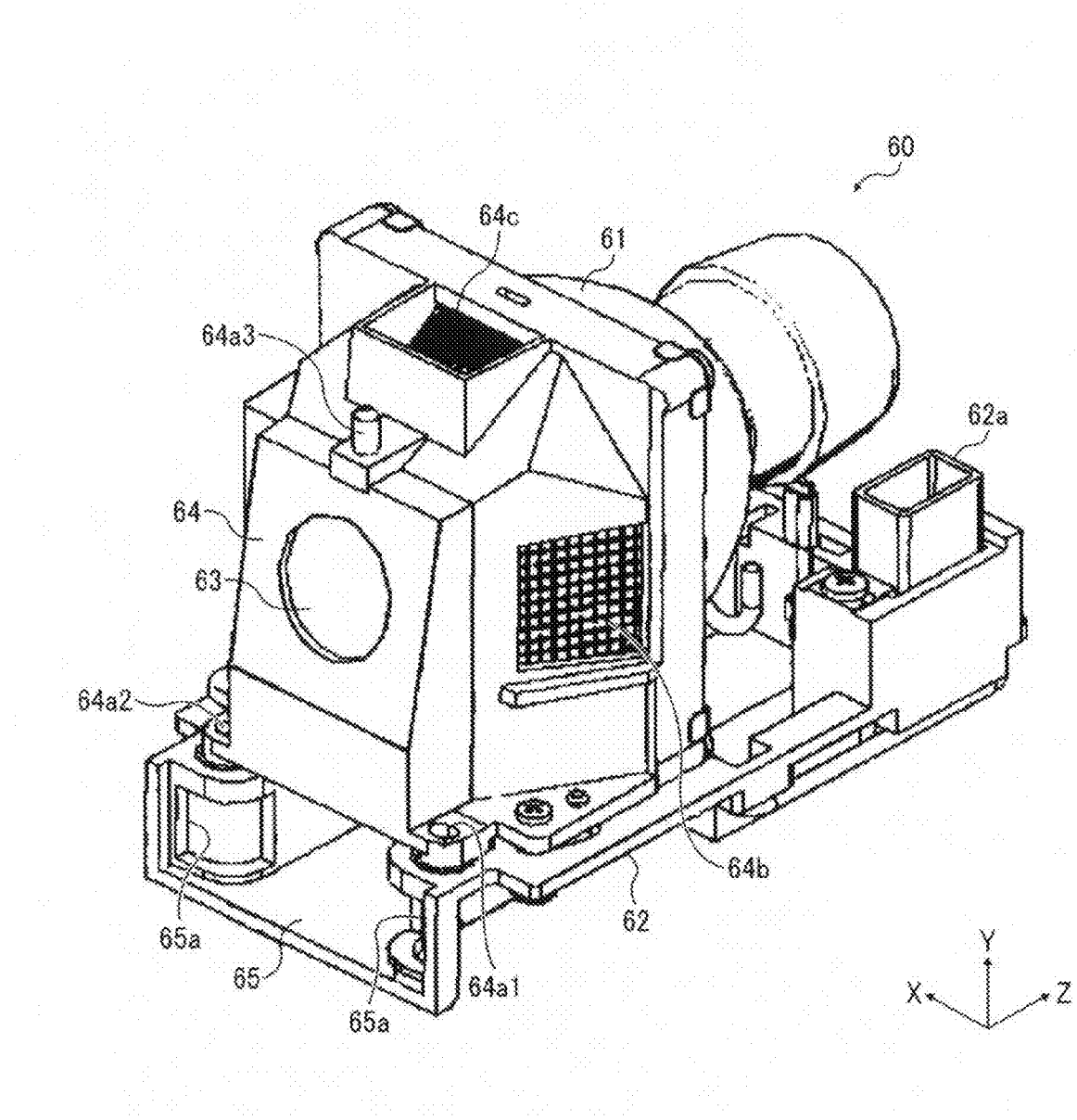
FIG. 5 is a perspective diagram illustrating the light source unit.

FIG. 5 is a perspective diagram illustrating the light source unit.

The light source unit 60 includes a light source bracket 62, and a light source 61 such as a halogen lamp, a metal halide lamp, and high-pressure mercury vapor lamp etc. The light source bracket 62 includes a connector 62a to connect to a power connector connected to a power supply (not shown in figures). The connector 62a is placed on one end in the longitudinal direction (z direction) of the light source unit 60.

A holder 64 that holds a reflector (not shown in figures) etc. is screwed on the upper part of the light source bracket 62 and the light-emitting side of the light source 61. On the surface opposed to the light source 61 of the holder 64, an emitting window 63 is placed. After being emitted from the light source 61, the light is focused on the emitting window 63 by a reflector held by the holder 64 (not shown in figures) and is emitted from the emitting window 63.

Light source positioning parts 64a1, 64a2, and 64a3 to position the light source unit 60 on a lighting bracket 26 (shown in FIG. 6) in the lighting unit 20 are placed on both ends in the x direction, the upper surface of the holder 64 and the lower surface of the holder 64. The two light source positioning parts 64a1 and 64a2 placed on the lower surface of the holder 64 are formed as holes. By contrast, the light source positioning part 64a3 placed on the upper surface of the holder 64 is formed as a projection.

On the side surface of the holder 64, a light source intake duct 64b that intakes air to cool the light source 61 is placed. On the upper surface of the holder 64, a light source exhaust vent 64c that exhausts air heated by the light source 61 is placed.

On the light source bracket 62, a handle unit 68 to unmount the light source unit 60 by pinching by a user operation in replacing the light source unit 60 is placed. The handle unit 68 is mounted rotatably in the longitudinal direction (z direction in FIG. 5) of the light source bracket 62 in the almost center of the connector unit 62a and the light source positioning parts 64a1 and 64a2. The handle unit 68 can be an appropriate form pinchable by a user operation other than the form shown in figures.

Figure 6:
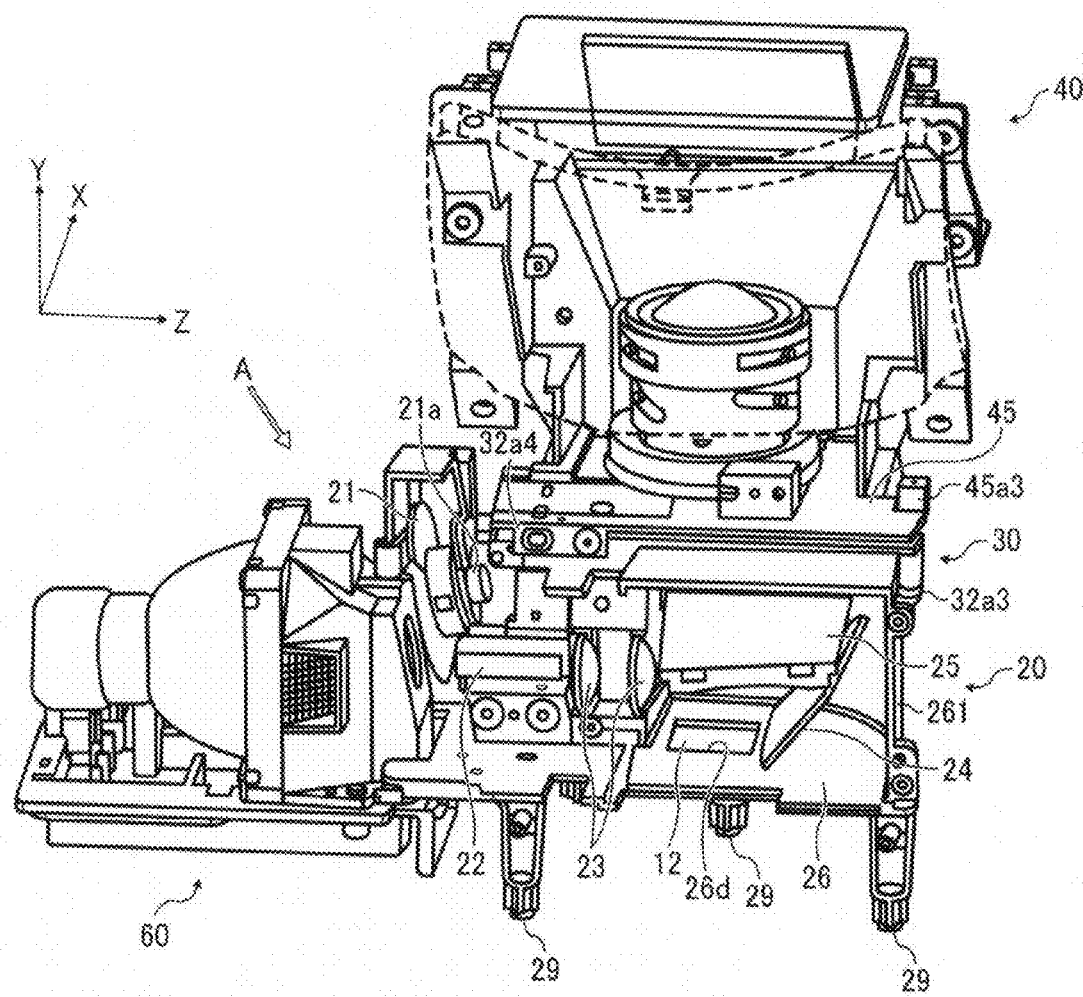
FIG. 6 is a perspective diagram illustrating a lighting unit.

FIG. 6 is a perspective diagram illustrating optical devices included in the lighting unit 20 along with other units.

As shown in FIG. 6, the lighting unit 20 includes a color wheel 21, a light tunnel 22, two relay lenses 23, a cylinder mirror 24, and a concave mirror 25, and those units are held by a lighting bracket 26. The lighting bracket 26 includes a housing part 261 that contains the two relay lenses 23, the cylinder mirror 24, and the concave mirror 25. Among four side surfaces of the housing part 261, only the right surface in FIG. 6 includes a panel, and other three surfaces are open. An off light board 27 (shown in FIG. 8) is mounted on the side opening back in the x direction in FIG. 6. A cover unit (not shown in figures) is mounted on the side opening front in the x direction in FIG. 6. Consequently, the two relay lenses 23, the cylinder mirror 24, and the concave mirror 25 are covered by lighting bracket 26, the off light board 27 (shown in FIG. 6), and the cover unit (not shown in figures).

In addition, there is a through-hole 26d to expose the DMD 12 on the lower surface of the housing unit 261 in the lighting bracket 26.

The lighting bracket 26 includes three legs 29. These legs 29 contact a base unit 53 (shown in FIG. 13) in the image projector 1 and support weight of the first optical unit 30 and the second optical unit 40 stacked on and fixed to the lighting bracket 26. In addition, space that outside air flows to the heat sink 13 (shown in FIG. 8) as a radiator to radiate heat of the DMD 12 in the light modulator 10 is formed by laying out the legs 29.

The symbols 32a3 and 32a4 shown in FIG. 6 indicate the leg parts of the lens holder 32 in the first optical unit 30, and the symbol 45a3 shown in FIG. 5 indicates the screwed part 45a3 in the second optical unit 40.

Figure 7:
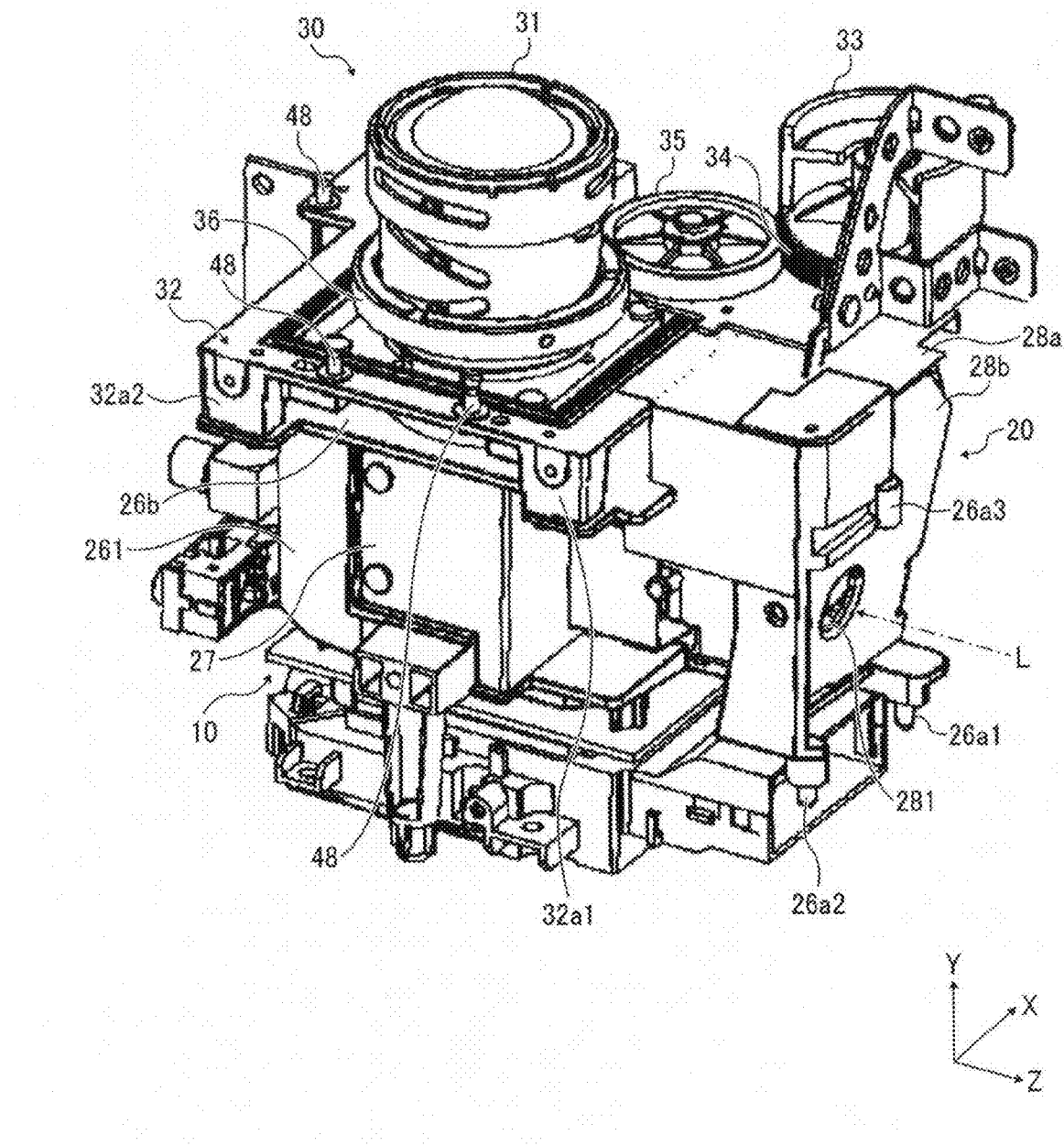
FIG. 7 is a perspective diagram illustrating the lighting unit, a projection lens unit, and an image forming unit viewed from direction A shown in FIG. 6.

FIG. 7 is a perspective diagram illustrating the lighting unit 20, the projection optical system 30, and the light modulator 10 viewed from direction A shown in FIG. 6

The first projection optical system 30 is placed above the lighting unit 20 and includes a projection lens unit 31 that holds the first optical system 70 (shown in FIG. 3) that consists of multiple lenses and a lens holder 32 that holds the projection lens unit 31. The lens holder 32 includes four legs 32a1, 32a2, 32a3, and 32a4 extending downward. (Only legs 32a1 and 32a2 are shown in FIG. 7. The legs 32a3 and 32a4 are shown in FIG. 6.) There are screw holes to be screwed on the lighting bracket 26 on each of the bottom surfaces of the legs 32a1, 32a2, 32a3, and 32a4.

There is an upper surface 26b perpendicular to the y direction in FIG. 7 on the upper part of the housing part 261 in the lighting bracket 26. There are through-holes (not shown in figures) that a screw that screws the first optical unit 30 goes through on four corners of the upper surface 26b. The first projection optical system 30 is mounted on the lighting unit 20 by inserting screws into these through-holes and screwing on the screw holes placed on the bottom surfaces of each of the legs 32a1, 32a2, 32a3, and 32a4.

The projection lens unit 31 includes a focusing gear 36, and the focusing gear 36 engages with an idler gear 35. The idler gear 35 engages with a lever gear 34, and a focusing lever 33 is fixed to the rotating axis of the lever gear 34. As shown in FIG. 1, the top part of the focusing lever 33 is exposed from the main body of the image projector 1.

In case of moving the focusing lever 33, the focusing gear 36 rotates via the lever gear 34 and the idler gear 35. As the focusing gear 36 rotates, multiple lenses that consist of the first optical system 70 in the projection lens unit 31 move in predetermined directions individually to focus the projection image.

The lens holder 32 includes four screw through-holes to go through screws 48 to screw the second projection optical system 40 on the first projection optical system 30. (In FIG. 7, three screw through-holes are shown, and the screws 48 go through each screw through-holes. The tips of screw part of the screws 48 are shown in FIG. 7.)

There is a blackout board (not shown in figures) that the lower part of the projection lens unit 31 fits at the opening part on the upper surface of the lighting bracket 26, and the blackout board 262 prevents light from entering inside the housing part 261 from up above.

There is a tube-shaped light source positioned part 26a3 that the through-hole is formed horizontally and the projection-shaped light source positioning part 64a3 (shown in FIG. 5) fits on one end where the color wheel 21 in the lighting bracket 26 exists (front side in the z direction in FIG. 7). There are two projection-shaped projection light source positioned parts 26a1 and 26a2 that two hole-shaped light source positioning parts 64a1 and 64a2 placed in the light source bracket 62 side on the holder 64 fit. By fitting the three light source positioning parts 64a1, 64a2, and 64a3 of the holder 64 into the three light source positioned parts 26a1, 26a2, and 26a3 on the lighting bracket 26 in the lighting part 20, the light source unit 60 is positioned and fixed to the lighting unit 20 (shown in FIG. 4).

The lighting bracket 26 includes a lighting cover 28a that covers the color wheel 21 and the light tunnel 22 and a wheel cover 28b that covers the surface on the color wheel 21 opposite to the light source 61. A through-hole 281 to pass the light from the light source 61 is placed on the wheel cover 28b.

Figure 8:
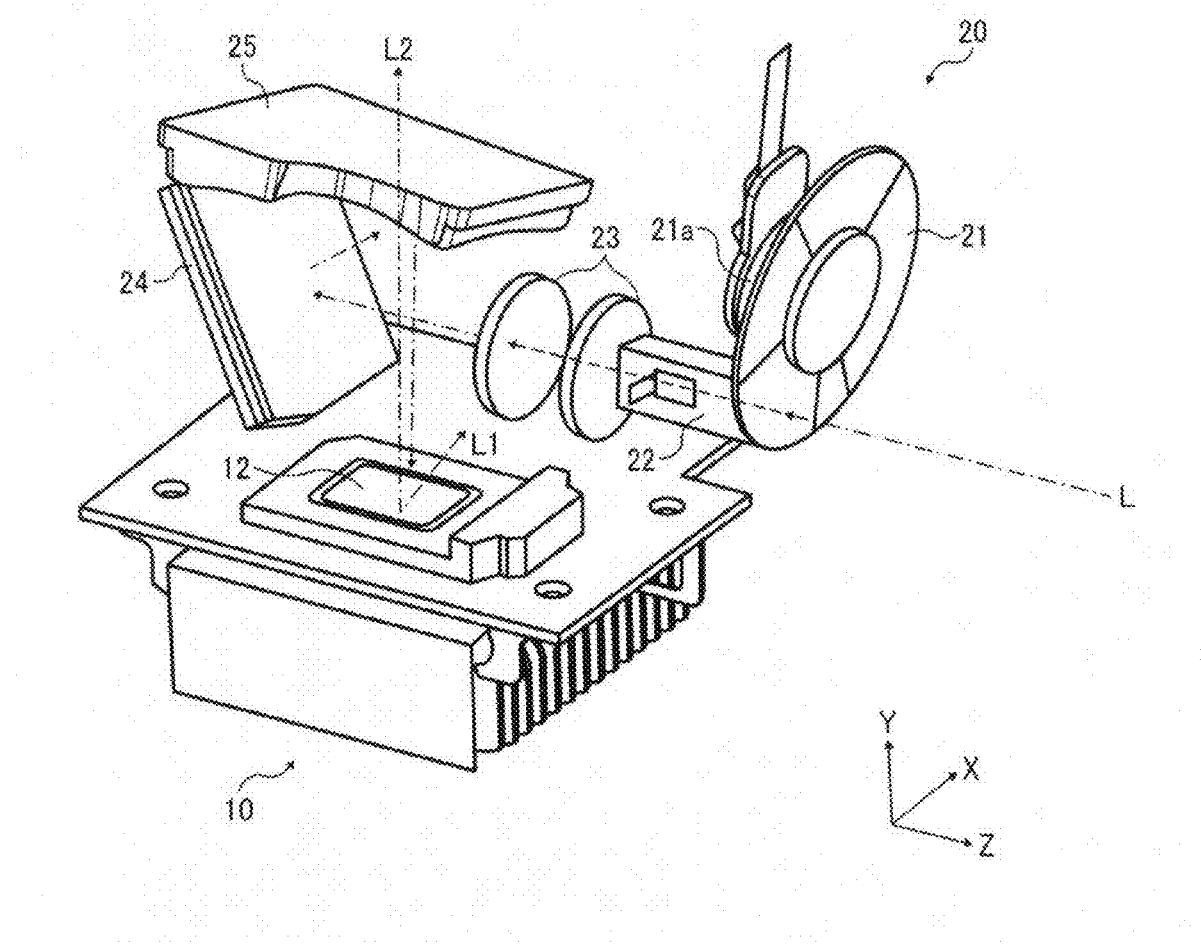
FIG. 8 is a diagram illustrating light path in the lighting unit.

FIG. 8 is a diagram illustrating light path L in the lighting unit 20.

The color wheel 21 is discoid and fixed to the motor axis of the color motor 21a. There are filters R (red), G (green), and B (blue) etc. in the rotating direction on the color wheel 21. Light focused by a reflector (not shown in figures) on the holder 64 of the light source unit 60 goes through the emitting window 63 and arrives at the peripheral area of the color wheel 21. After arriving at the peripheral part of the color wheel 21, the light is split into R light, G light and B light by the rotation of the color wheel 21 time-divisionally.

After being split by the color wheel 21, the light enters into the light tunnel 22. The inner surface of the square tube-shaped light tunnel 22 is mirror-finished. After entering into the light tunnel 22, the light is reflected multiple times on the inner surface of the light tunnel 22, the light becomes uniform surface light source, and the light is emitted toward the relay lenses 23.

After going through the light tunnel 22, the light goes through the two relay lenses 23, the light is reflected by the cylinder mirror 24 and the concave mirror 25, and the light focuses on the image generating surface of the DMD 12 to form an image.

Figure 9:
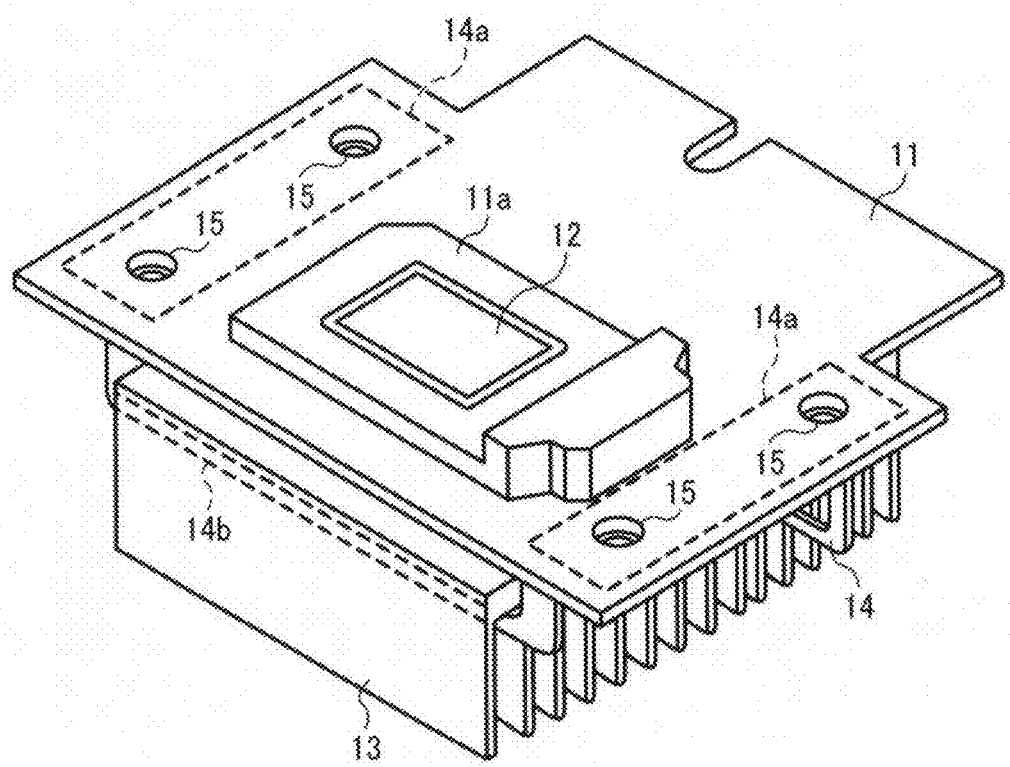
FIG. 9 is a perspective diagram illustrating the light modulator.

FIG. 9 is a perspective diagram illustrating the light modulator 10.

As shown in FIG. 9, the light modulator 10 includes the DMD board 11 that mounts the DMD 12. The DMD 12 is mounted on a socket 11a placed on the DMD board 11 facing the image generating surface where micro mirrors are placed in a reticular pattern upward. The DMD board 11 includes a driving circuit to drive the DMD mirrors and other circuits. On the backside of the DMD board 11 (the opposite side to the side where the socket 11a is placed), the heat sink 13 that radiates the heat of the DMD 12 as a radiator is fixed. On the DMD board 11, the part where the DMD 12 is mounted is through-holed, and the heat sink 13 includes a projecting part 13a that fits in to the through-hole (not shown in figures). The head of the projecting part 13a forms a flat surface. After inserting the projecting part 13a into the through-hole (not shown in figures), the flat surface at the head of the projecting part 13a contacts the backside of the DMD 12 (the opposite side to the image generating surface). It is possible to improve heat conductivity by mounting an elastic transformable heat transfer seat at the flat surface or the point on the backside of the DMD 12 where the heat sink 12 contacts and enhancing adhesiveness between the flat surface of the projecting part 13a and the backside of the DMD 12.

The heat sink 13 is pressed and fixed to the surface on the DMD board 11 opposite to the surface where the socket 11a is placed by a fixing component 14. The fixing component 14 includes a board-shaped fixing part 14a that opposes to the right part of the backside of the DMD board 11 in FIG. 9 and a board-shaped fixing part 14a that opposes to the left part of the backside of the DMD board 11 in FIG. 9. There is a pressing part 14b to interlink the left fixing part with the right fixing part around one end and the other end in the x direction of each of the fixing parts.

After screwing the light modulator 10 onto the lighting bracket 26 (shown in FIG. 6), the heat sink 13 is pressed and fixed to the surface opposite to the surface where the socket 11a is mounted on the DMD board 11 by the fixing component 14.

How the lighting bracket 26 in the light modulator 10 is fixed is described below. First, the DMD 12 positions the light modulator 10 on the lighting bracket 26 so that the light modulator 10 faces onto the opening duct of the emitting through-hole 26d placed on the lower surface of the lighting bracket 26 in the lighting unit 20 shown in FIG. 5. Subsequently, a screw is inserted from downside in FIG. 7 so that the screw goes through the through-hole placed on the fixing part 14a (not shown in figures) and the through-hole 15 on the DMD board 11. Subsequently, the screw is screwed into a screw hole placed on the lower part of the screwing part 263 (shown in FIG. 3) mounted on the lighting bracket 26 to fix the light modulator 10 on the lighting bracket 26. As the screw is screwed on the screwing part 263 mounted on the lighting bracket 26, the fixing part 14 pushes the heat sink 13 to the side of the DMD board. Consequently, the heat sink 13 is pressed and fixed to the surface opposite to the surface where the socket 11a is mounted on the DMD board 11.

As described above, the light modulator 10 is fixed to the lighting bracket 26, and the three legs 29 shown in FIG. 5 also supports the weight of the light modulator 10.

On the image generating surface of the DMD 12, the mobile multiple micro mirrors are placed in a reticular pattern. Each micro mirror can incline the mirror surface at a predetermined angle around the twisting axis to have two states, "on" and "off". If the micro mirror is in the "on" state, as the arrow L2 in FIG. 7 indicates, the micro mirror reflects the light from the light source 61 into the first optical system 70 (shown in FIG. 2). If the micro mirror is in the "off" state, as the arrow L1 in FIG. 7 indicates, the micro mirror reflects the light from the light source 61 into the off light board 27 held at the side of the lighting bracket 26 shown in FIG. 6. Consequently, by driving each mirror individually, it is possible to control projecting the light for each pixel of the image data and to generate the image.

The light reflected to the off light board 27 (not shown in figures) is absorbed as heat, and it is cooled by outside airflow.

Figure 10:
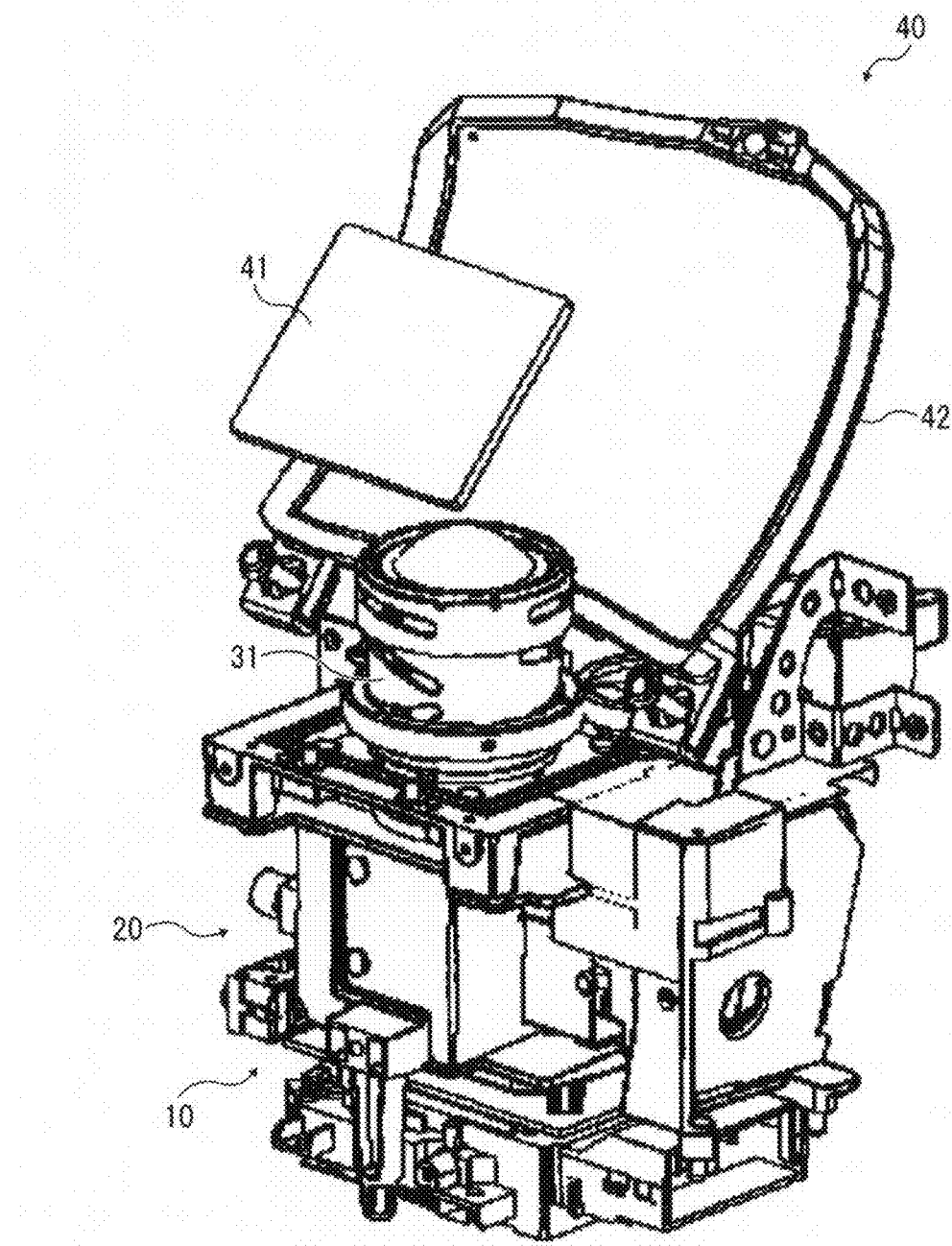
FIG. 10 is a perspective diagram illustrating a second optical system held by a second projection optical unit along with a projection lens unit, the lighting unit, and the light modulator.

FIG. 10 is a perspective diagram illustrating the second optical system held by the second projection optical system 40 along with a projection lens unit 31, the lighting unit 20, and the light modulator 10. As shown in FIG. 10, the second projection optical system 40 includes a reflecting mirror 41 and concave curved mirror 42 that consists of the second optical system. The reflecting surface of the curved mirror 42 can be formed as spherical surface, rotation symmetric aspheric surface, and sculptured surface.

Figure 11:
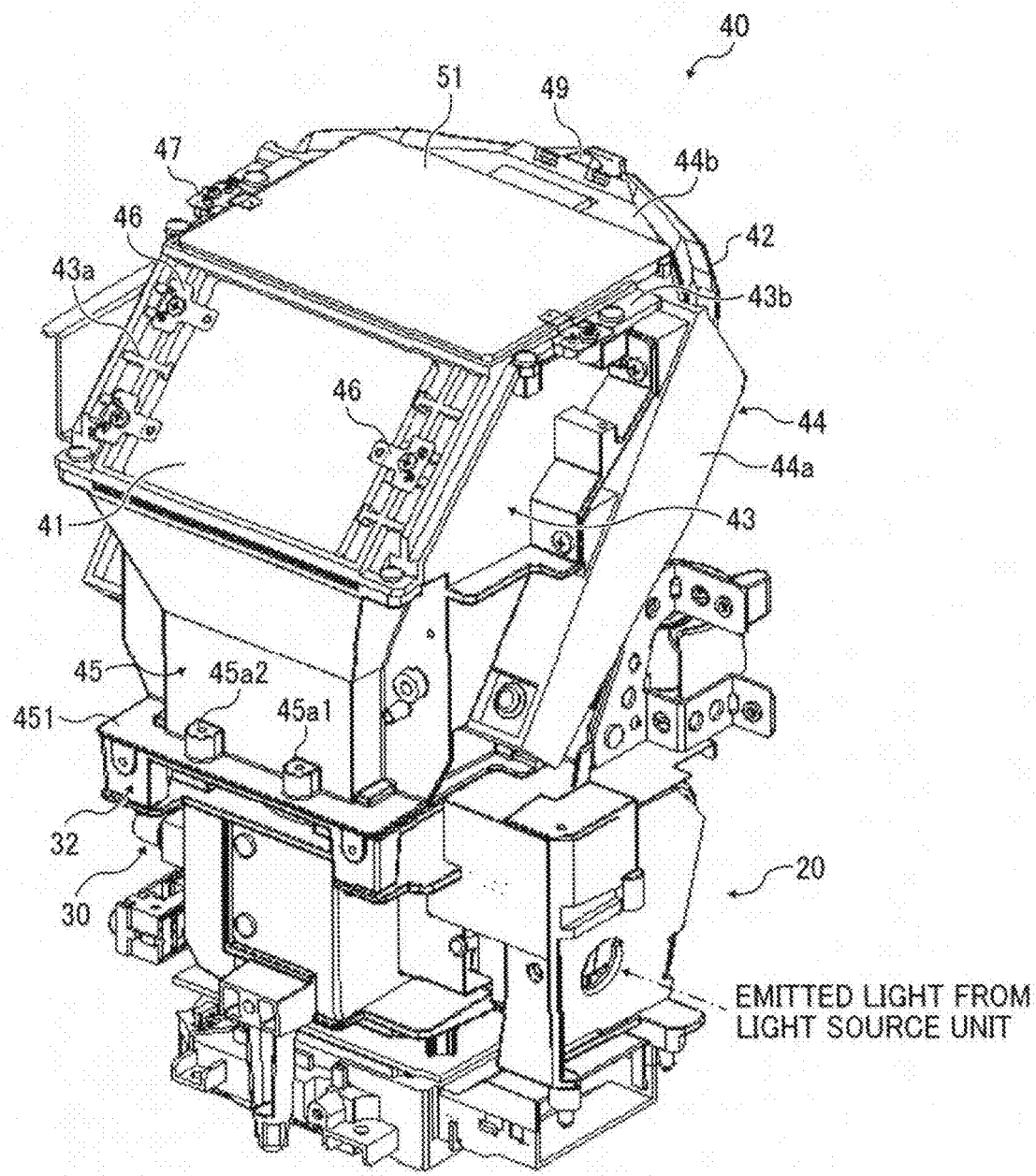
FIG. 11 is a perspective diagram illustrating a second projection optical unit along with a first projection optical unit, the lighting unit, and the light modulator.

FIG. 11 is a perspective diagram illustrating the second projection optical system 40 along with the first projection optical system 30, the lighting unit 20, and the light modulator 10. As shown in FIG. 11, the second projection optical system 40 includes the dustproof glass window 51 to transmit the image reflected by the curved mirror 42 and protect the optical devices in the image projector from dust.

The second projection optical system 40 includes a mirror bracket 43 that holds the reflecting mirror 41 and the dustproof glass window 51. In addition, the second projection optical system 40 includes a free mirror bracket 44 that holds the curved mirror 42 and a mirror holder 45 that holds the mirror bracket 43 and the free mirror bracket 44.

The mirror holder 45 is boxed-shape. The top surface, the bottom surface, and the backside in the x direction of the mirror holder 45 are opened in FIG. 11. The mirror holder 45 looks U-shaped from up. Edge parts extending in the x direction at each of front side and backside in the z direction of the upper opening of the mirror holder 45 consist of a gradient part and a flat part. The gradient part rises as going from the front edge in the x direction to the back edge in the x direction in FIG. 11. The flat part is parallel to the x direction in FIG. 11. The gradient part is placed at the front side in the x direction in FIG. 11 compared to the parallel part. The edge part at the front side in the x direction of the upper opening of the mirror holder 45 extending to the z direction is parallel to the z direction in FIG. 11.

The mirror bracket 43 is mounted on the upper part of the mirror holder 45. The reflecting mirror 41 is held so that the reflecting mirror 41 blocks the opening duct on the inclined surface of the mirror bracket 43, and the dustproof glass window 51 is held so that the dustproof glass window 51 blocks the upper opening duct of the mirror bracket 43. The free mirror bracket 44 that holds the curved mirror 42 is mounted on the mirror holder 45. The second projection optical system 40 is fixed and mounted on the lens holder 32 in the first optical unit 30. Consequently, the projection lens unit 31 is surrounded by the reflecting mirror 41, the curved mirror 42, the mirror bracket 43, the free mirror bracket 44, the mirror holder 45, and the dustproof glass window 51.

The reflecting mirror 41 is positioned and held on the gradient surface 43a of the mirror bracket 43 by pressing its both ends in the z direction to the gradient surface 43a of the mirror bracket 43 by a leaf spring-shaped mirror holding part 46. One end of the reflecting mirror 41 in the z direction is fixed by the two mirror holding parts 46, and the other end of the reflecting mirror 41 is fixed by the one mirror holding part 46.

The dustproof glass window 51 is positioned and held on the mirror bracket 43 by pressing its both ends in the z direction to the flat surface 43b of the mirror bracket 43 by a leaf spring-shaped glass holding part 47. The dustproof glass window 51 is held by the one glass holding part 47 at each of the both ends in the z direction.

The free mirror bracket 44 that holds the curved mirror 42 includes slanted arm parts 44a descending from the backside to the front side in the x direction in FIG. 11 at the front side and the backside in the z direction. The free mirror bracket 44 includes an interlinking part 44b that interlinks these two arm parts 44a at the upper part of the arm part 44a. The arm part 44a of the free mirror bracket 44 is mounted on the mirror holder 45 so that the curved mirror 42 covers the opening of the mirror holder 45 on the backside in the x direction in FIG. 11.

At the top edge of the curved mirror 42, almost center part of the edge part at the side of the dustproof glass window 51 is held to the interlinking part 44b of the free mirror bracket 44 by a leaf spring-shaped free mirror holding part 49. The both ends on the side of the first optical system in the z direction in FIG. 11 are screwed on the arm part 44a of the free mirror bracket 44.

The second projection optical system 40 is mounted and fixed on the lens holder 32 of the first projection optical system. More specifically, there is a lower surface 451 on the lower part of the mirror holder 45 opposed to an upper surface of the lens holder 32. On the lower surface 451, four tube-shaped screwed parts 45a1, 45a2, and 45a3 to screw on the first projection optical system 30 are formed. (The screwed part 45a1 and 45a2 are shown in FIG. 11. The screwed part 45a3 is shown in FIG. 6. Other screwed parts are not shown in figures.) The second projection optical system 40 is screwed on the first projection optical system 30 by running the screw 48 through the screw through-holes placed on the lens holder 32 in the first projection optical system 30 and screwing the screws 48 in the screwed parts 45a1, 45a2, and 45a3.

When the second projection optical system 40 is mounted on the lens holder 32 in the first projection optical system 30, as shown in FIG. 7, the upper part of the projection lens unit 31 above the lens holder 32 is contained in the mirror holder 45 in the second projection optical system 40. In addition, when the second projection optical system 40 is mounted on the lens holder 32 in the first projection optical system 30, there is a gap between the curved mirror 42 and the lens holder 32, and the idler gear 35 (shown in FIG. 7) enters in that gap.

Figure 12:
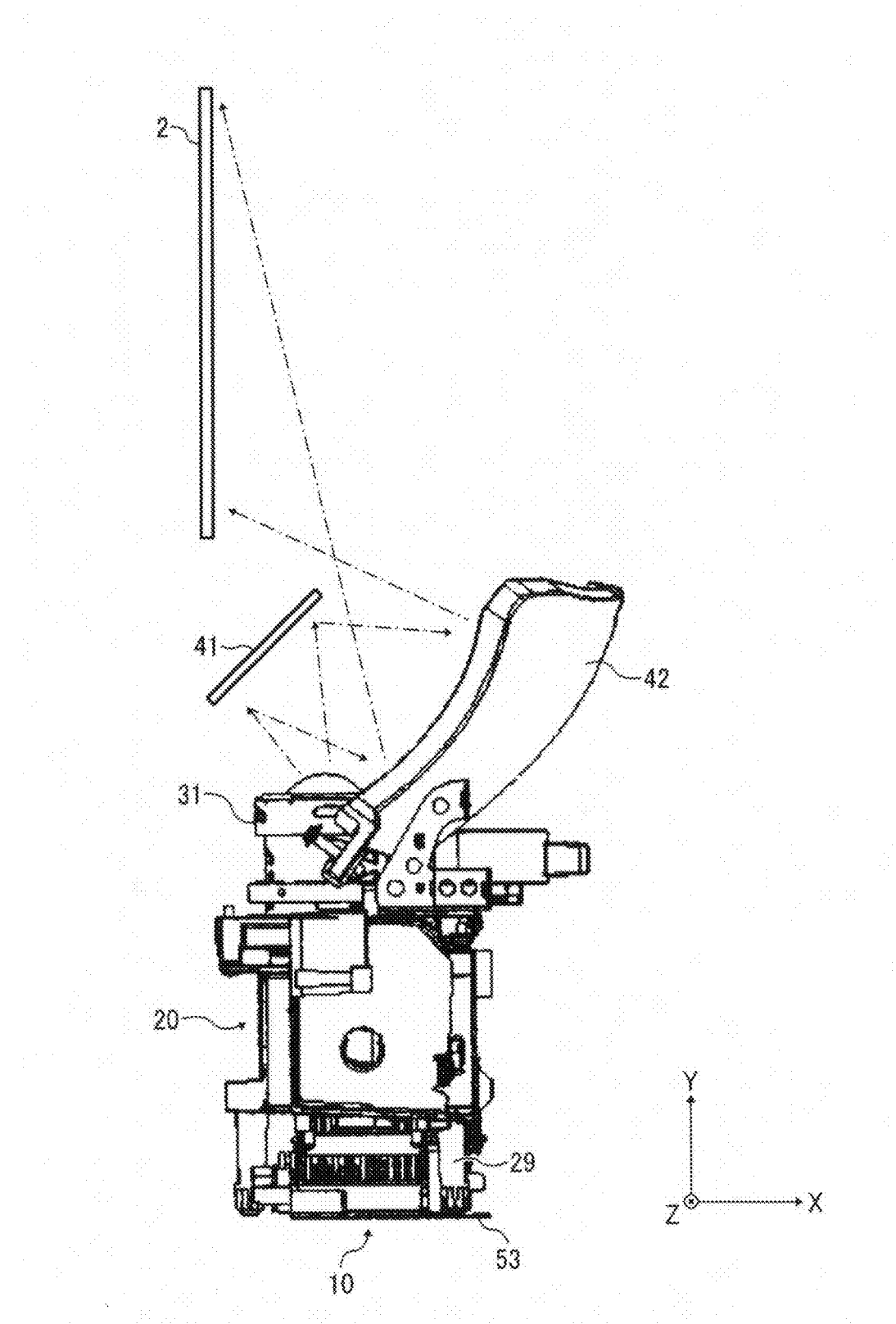
FIG. 12 is a perspective diagram illustrating light paths from a first optical unit to the projection surface.

FIG. 12 is a perspective diagram illustrating light path from the first optical system 70 to the projection surface 2 (screen).

After passing through the projection lens unit 31 that consists of the first optical system 70, the light beam forms an intermediate image conjugated with the image generated by the DMD 12 between the reflecting mirror 41 and the curved mirror 42. This intermediate image is formed as curved image between the reflecting mirror 41 and the curved mirror 42. Subsequently, after forming the intermediate image, the diffusing light beam enters into the concave curved mirror 42, becomes convergent light beam, and projects the intermediate image onto the projection surface 2 enlarging the intermediate image by the curved mirror 42.

As described above, it is possible to make projection distance short and use the image projector in a small meeting room etc. by consisting of the projection optical system with the first optical system 70 and the second optical system, forming the intermediate image between the first optical system 70 and the curved mirror 42 in the second optical system, and projecting the intermediate image enlarging by the curved mirror 42.

As shown in FIG. 12, the lighting bracket 26 mounts the first optical unit 30 and the second optical unit 40. In addition, the light modulator 10 is fixed on the lighting bracket 26. Consequently, the legs 29 of the lighting bracket 26 is fixed to the base part 53 supporting weight of the first optical unit 30, the second optical unit 40, and the light modulator 10.

Figure 13:
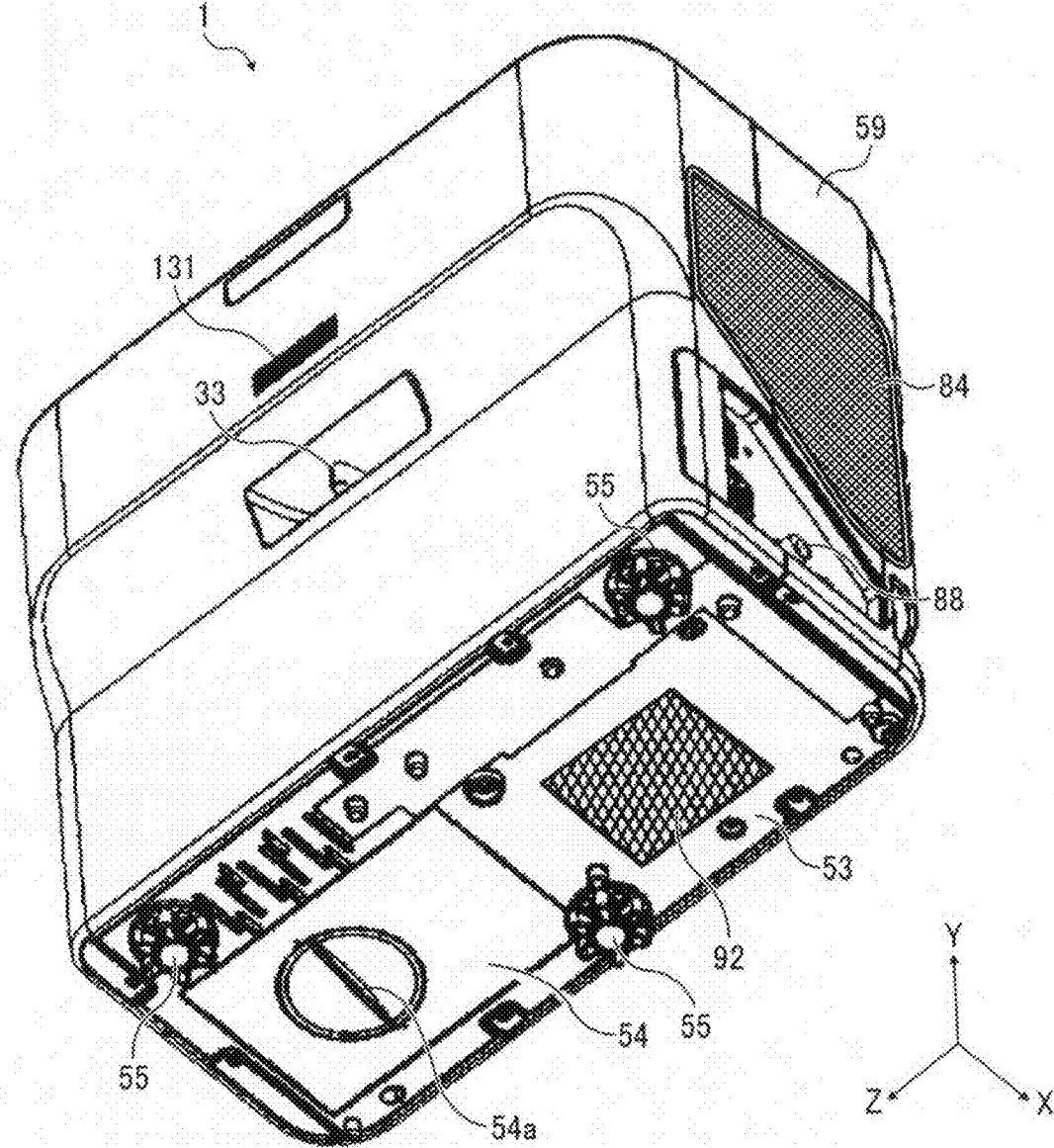
FIG. 13 is a perspective diagram illustrating the image projector viewed from a supported surface.

FIG. 13 is a perspective diagram illustrating the image projector 1 viewed from a supported surface.

As shown in FIG. 13, there is an opening cover 54 on a base part 53 that consists of the bottom surface of the image projector 1, and there is a rotation operating part 54a on the opening cover 54. In case of rotating the rotation operating part 54a, the opening cover 54 is released from the main body of the image projector 1, and the opening cover 54 become removable from the main body of the image projector 1. There is a first intake duct 92 on the base part 53 opposite to the DMD 12.

Heat value of the color motor 21a becomes high in order to rotate the color wheel 21 at high speed. If the color motor 21a becomes high temperature, it becomes difficult to rotate the color wheel 21 stably, and the projection image becomes deteriorated. To cope with this issue, the color motor 21a is air-cooled by circulating air through the color motor 21a conventionally. However, in this case, it is possible that part of air flowed through the color motor 21a flows into the color wheel 21. More specifically, since the color wheel 21 rotates at high speed, surrounding of the color wheel 21 becomes negative-pressure. Therefore, part of air for cooling the color motor 21a flows through the color wheel 21. As described above, if the air is flowed through the color motor 21a, dust moves toward the color motor 21a along with the air. Consequently, if part of air for cooling the color motor 21a flows through the color wheel 21, the dust included in the air moves toward the color wheel 21 together. As a result, the dust collects on the color wheel 21, and that results in lowering brightness and deteriorating color tone. To cope with this issue, in this embodiment, it is possible to cool the color motor 21a without circulating air through the color motor 21a. Explanation that is more specific is described below with reference to figures.

Figure 14:
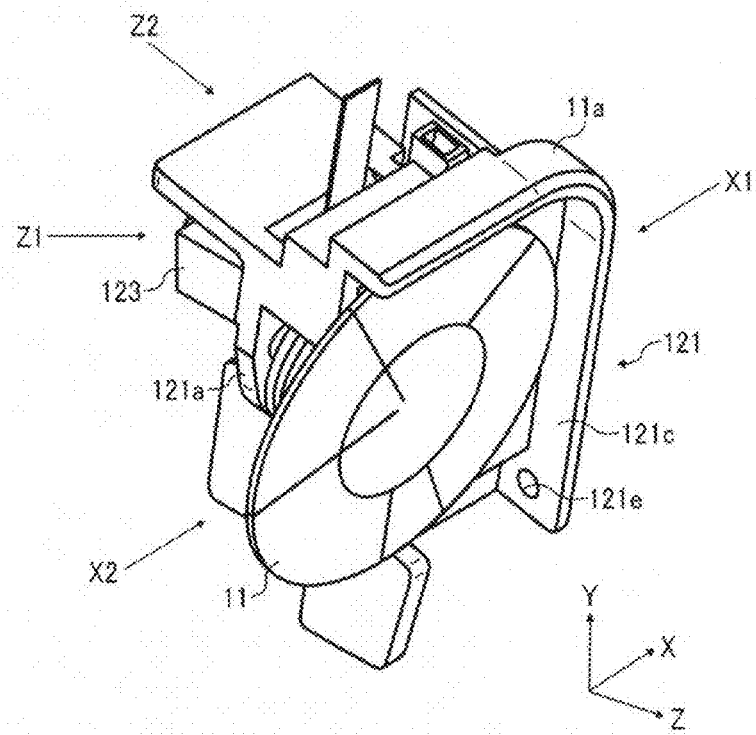
FIG. 14 is a perspective diagram illustrating a configuration surrounding a color wheel.
Figure 15:
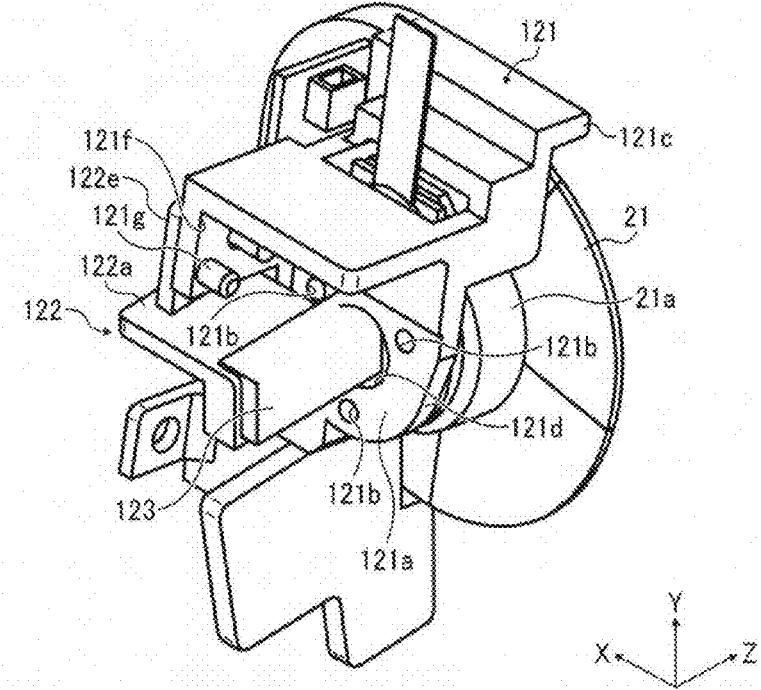
FIG. 15 is a diagram illustrating the configuration viewed from Z1 direction in FIG. 14.
Figure 16:
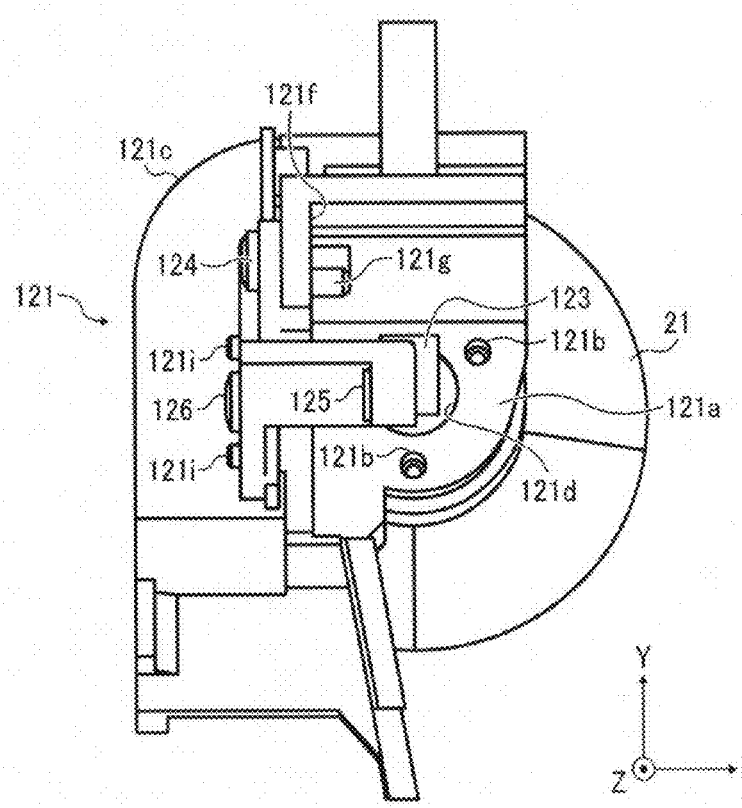
FIG. 16 is a diagram illustrating the configuration viewed from Z2 direction in FIG. 14.
Figure 17:
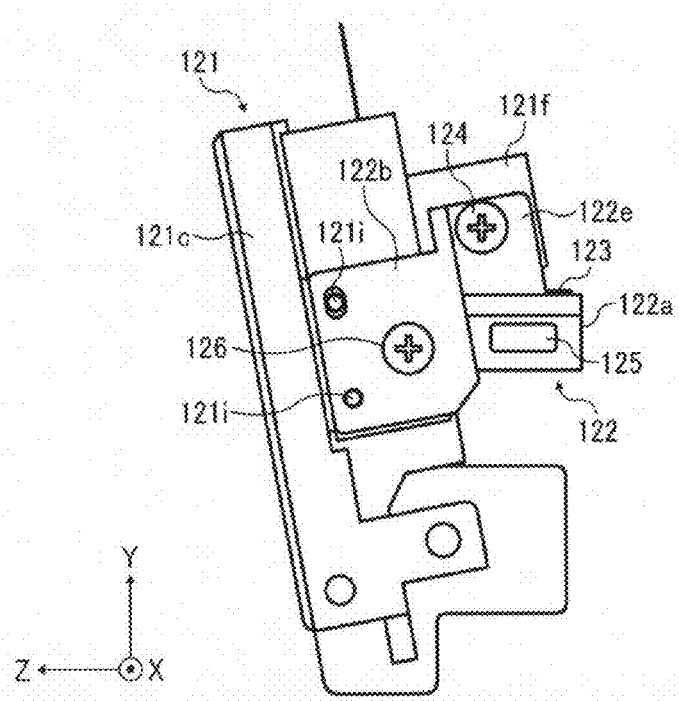
FIG. 17 is a diagram illustrating the configuration viewed from X1 direction in FIG. 14.
Figure 18:
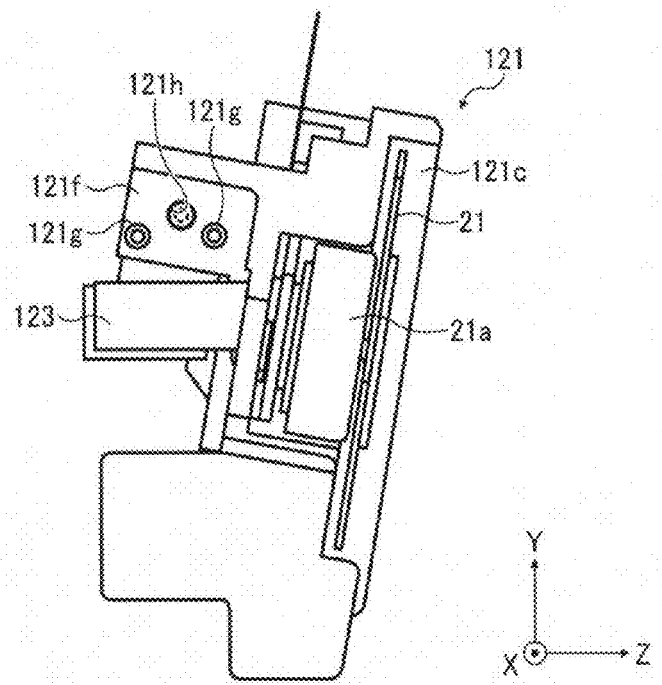
FIG. 18 is a diagram illustrating the configuration viewed from X2 direction in FIG. 14.

FIG. 14 is a perspective diagram illustrating a configuration surrounding the color wheel 21. FIG. 15 is a diagram illustrating the configuration viewed from Z1 direction in FIG. 14. FIG. 16 is a diagram illustrating the configuration viewed from Z2 direction in FIG. 14. FIG. 17 is a diagram illustrating the configuration viewed from X1 direction in FIG. 14. FIG. 18 is a diagram illustrating the configuration viewed from X2 direction in FIG. 14.

The color motor 21a that mounts the color wheel 21 is fixed to a wheel bracket 121 made of resin. As shown in FIG. 15 and FIG. 16, the wheel bracket 121 includes a motor mounting surface 121a on which the color motor 21a is mounted. There is a through-hole for cooling 121d that a cooling part 123 goes through at almost center of the motor mounting surface 121a. There are three through-holes for mounting motor 121b at even pitches around the through-hole for cooling 121d on the motor mounting surface 121a. The color motor 21a is mounted on the wheel bracket 121 by inserting screws (not shown in figures) into the through-holes for mounting motor 121b and screwing those screws into screw holes on the color motor 21a (not shown in figures).

As shown in FIG. 14, the wheel bracket 121 includes a wheel cover unit 121c that covers the color wheel 21. At the lower end of the wheel cover unit 121c, there is a through-hole 121e to screw the wheel cover 28b shown in FIG. 7.

As shown in FIG. 15, FIG. 16, and FIG. 18, the wheel bracket 121 includes a bracket mounting part 121f to be mounted on the lighting bracket 26. As shown in FIG. 18, on the bracket mounting part 121f, there are two positioning projection parts 121g to position the wheel bracket 121 against the lighting bracket 26 at a predetermined pitch. Between these positioning projection part 121g, there is a through-hole 121h that the screw 124 shown in FIG. 16 goes through.

The wheel bracket 121 is positioned on the lighting bracket 26 by inserting the positioning projection part 121g into a positioning hole (not shown in figures) placed on the lighting bracket 26. Subsequently, the wheel bracket 121 is mounted on the lighting bracket 26 by inserting the screw 124 into the through-hole 121h and screwing the screw into the screw hole placed on the lighting bracket 26. That is, in this embodiment, the color wheel 21 and the color motor 21a are held by the lighting bracket 26 via the wheel bracket 121.

A cooling bracket 122 that holds a cooling device 123 that cools the color motor 21a is mounted on the wheel bracket 121.

Figure 19:
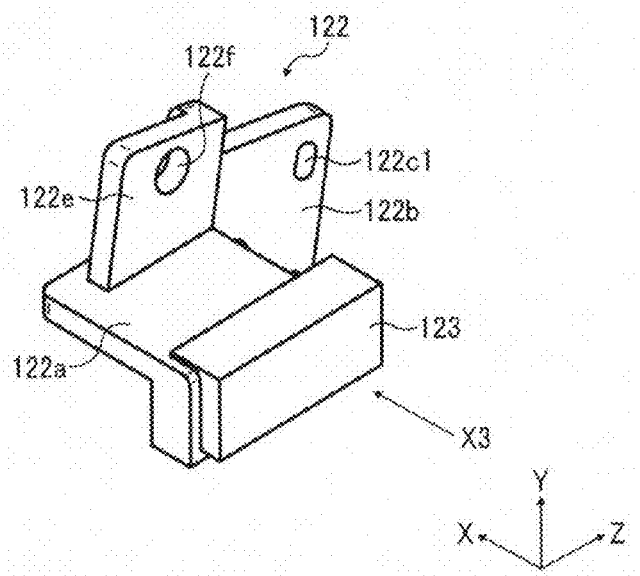
FIG. 19 is a perspective diagram illustrating a cooling bracket that holds a cooling device.
Figure 20:
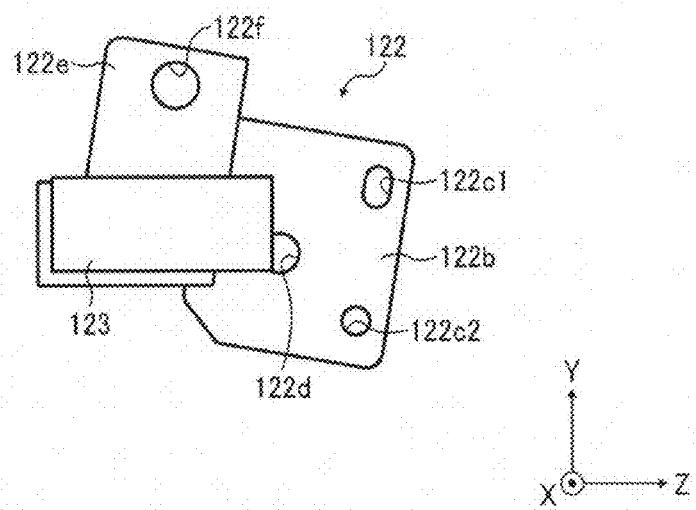
FIG. 20 is a diagram illustrating the configuration viewed from X3 direction in FIG. 19.

FIG. 19 is a perspective diagram illustrating the cooling bracket 122 that holds a cooling device 123. FIG. 20 is a diagram illustrating the configuration viewed from X3 direction in FIG. 19.

The cooling bracket 122 is made of resin and includes a cooling device mounting part 122a that holds the cooling device 123. The cross section of the cooling device mounting part 122a is L-shaped. The cooling device 123 is made of high-thermal-conductivity elastic material than the wheel bracket 121 and attached to the side surface (y-z plain) and the upper surface (x-z plain) of the cooling device mounting part 122a so that its cross section becomes L-shaped. The part of the cooling device 123 attached to the side surface (y-z plain) of the cooling device mounting part 122a is thicker than the part of the cooling device 123 attached to the upper surface of the cooling device mounting part 122a. The cooling device 123 is attached to the cooling device mounting part 122a so that a part of the cooling device 123 sticks out of the end of the color motor side of the cooling device mounting unit 122a.

As shown in FIG. 17, on the side surface of the cooling device mounting part 122a (y-z plain) opposite to the side where the cooling device 123 is attached, a second cooling device 125 is attached. The second cooling device 125 is also made of high-thermal-conductivity elastic material than the wheel bracket 121 just like the cooling device 123 as described above.

As shown in FIG. 19 and FIG. 20, the cooling bracket 122 includes a first mounting part 122b and a second mounting part 122e. The first mounting part 122b includes a first screw through-hole 122d that the screw 126 (shown in FIG. 17) goes through and positioning holes 122c1 and 122c2 to position on the wheel bracket 121. The positioning hole 122c2 placed at the lower part of the first mounting part 122b is a main criteria for positioning and circle-shaped. By contrast, the positioning hole 122c1 placed at the upper part of the first mounting part 122b is a sub-criteria for positioning, and the positioning hole 122c1 is slotted hole-shaped. The second mounting unit 122e includes a second screw through-hole 122f that the screw 124 goes through.

As shown in FIG. 17, there are two positioning projections 121i at a predefined pitch horizontally on the side surface of the wheel bracket 121. The cooling bracket 122 is positioned on the wheel bracket 121 by fitting the positioning holes 122c1 and 122c2 placed on the first mounting part 122b of the cooling bracket 122 on these positioning projections 121i. Subsequently, the cooling bracket 122 is mounted on the wheel bracket 121 by inserting the screw 126 into the first screw through-hole 122d and inserting the screw 126 into a screw hole (not shown in figures) placed on the wheel bracket 121.

After positioning and mounting the cooling bracket 122 on the wheel bracket 121, as shown in FIG. 15, the part projecting from the end part of the cooling device mounting part 122a in the cooling device 123 on the color motor side contacts the color motor 21a via the through-hole for cooling 121d. Consequently, the cooling device 123 can draw heat from the color motor 21a, and it is possible to prevent the color wheel 21 from being high temperature. Since the cooling device 123 is made of elastic material, it is possible that the cooling device 123 can make contact with the color motor 21a by transforming the cooling device 123 so that the cooling device 123 go alongside of the surface of the color motor 21a. As a result, it is possible that the cooling device 123 can be attached firmly to the color motor 21a, and it is possible that the cooling device 123 can draw heat from the color motor 21a preferably. Finally, it is possible to prevent the color motor 21a from being high temperature preferably.

The wheel bracket 121 is mounted on the lighting bracket 26 by inserting the screw 124 into the second screw through-hole 122f on the second mounting part 122e of the cooling bracket 122 and the through-hole 121h on the wheel bracket 121 and screwing the screw 124 into a screw hole (not shown in figures) on the lighting bracket 26.

Figure 21:
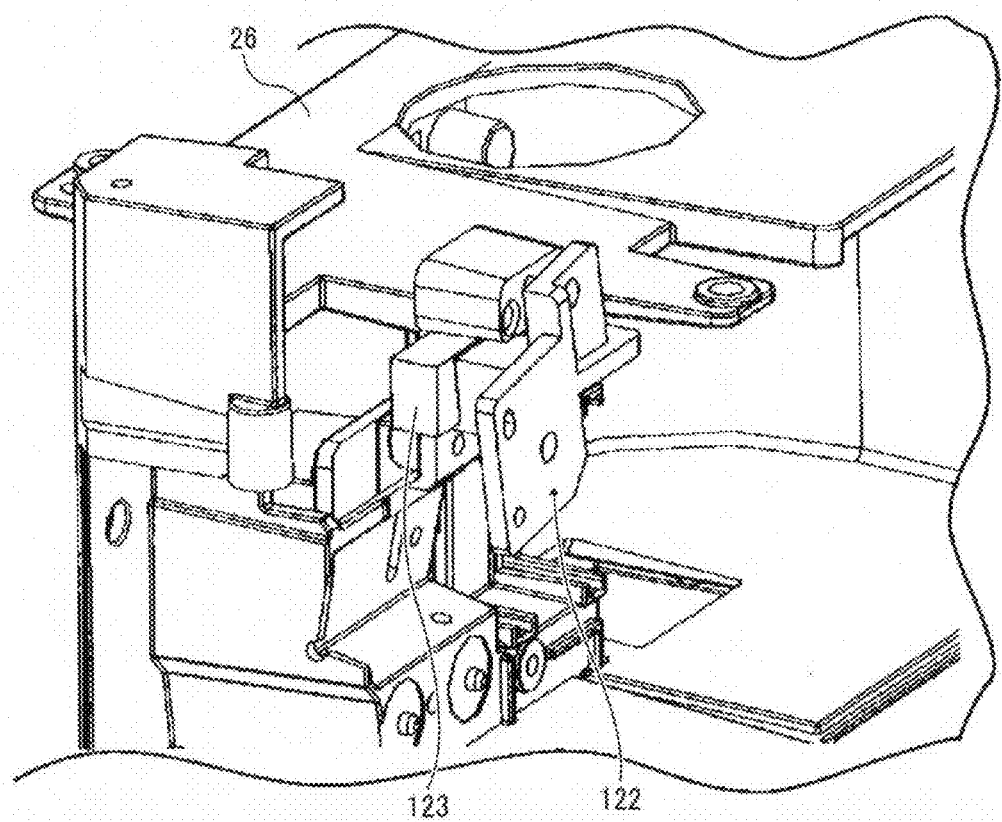
FIG. 21 is a perspective diagram illustrating a lighting bracket 26, a cooling device 123, and a cooling bracket 122.
Figure 22:
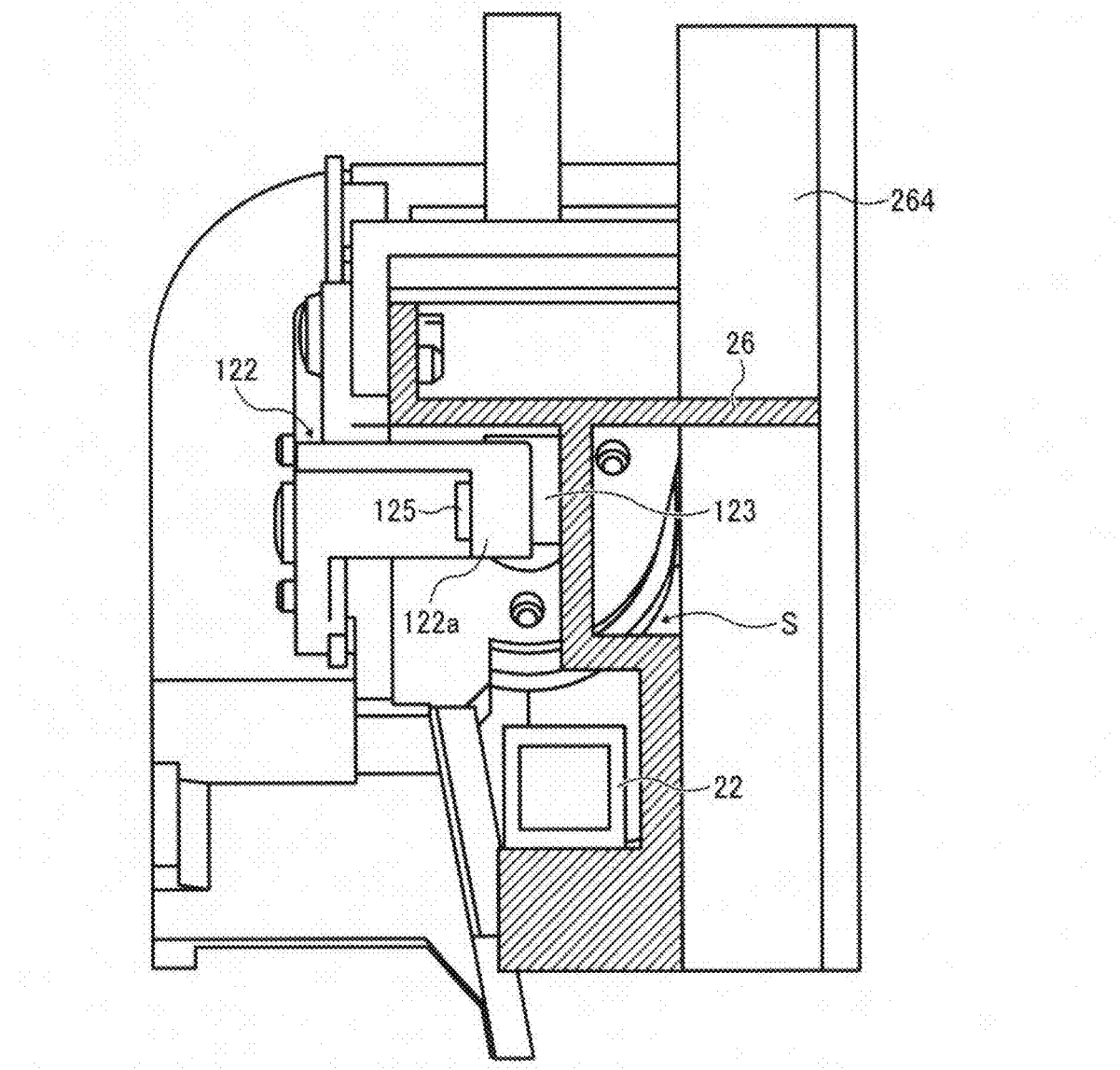
FIG. 22 is a diagram illustrating a status that a wheel bracket is fixed to the lighting bracket.

FIG. 21 is a perspective diagram illustrating the lighting bracket 26, the cooling device 123, and the cooling bracket 122. FIG. 22 is a diagram illustrating a status that the wheel bracket 121 is fixed to the lighting bracket 26.

The lighting bracket 26 is made of metal material such as magnesium. After mounting the wheel bracket 121 on the lighting bracket 26, the cooling device 123 contacts the lighting bracket 26. More specifically, a part attached on the side surface of the cooling device mounting part 122a of the cooling device 123 contacts the lighting bracket 26. Consequently, the heat drawn from the color motor 21a by the cooling device 123 moves to the lighting bracket 26, and it is possible that the heat of the color motor 21a is radiated via the lighting bracket 26. Since the surface area exposed to air of the lighting bracket 26 is larger than the cooling device, it is possible to radiate the heat of the color motor 21a effectively. As a result, it is possible to enhance the cooling efficiency of the cooling device 123 and prevent the color motor 21a from being high temperature more favorably.

Since the thickness of the part attached to the side surface of the cooling device mounting part 122a of the cooling device 123, it is possible to transform the contact surface of the cooling device with the lighting bracket 26 alongside of the surface of the lighting bracket 26. Consequently, it is possible that the cooling device 123 is attached to the lighting bracket 26, and it is possible to conduct the heat of the cooling device 123 to the lighting bracket 26 efficiently. As a result, it is possible to enhance further the cooling efficiency of the cooling device 123 and prevent the color motor 21a from being high temperature more favorably.

In this embodiment, as shown in FIG. 17, the second cooling device 125 is attached to the surface opposite to the surface where the cooling device 123 is attached on the side surface of the cooling device mounting part 122a (y-z plain). Consequently, it is possible that the second cooling device 125 can draw the heat conducted from the cooling device 123 to the cooling device mounting part 122a, and it is possible to prevent the cooling device mounting part 122a from being high temperature.

As described above, in this embodiment, it is possible to cool the color motor 21a without circulating air through the color motor 21a. As a result, the air is not flowed around the color wheel 21, and it is possible to prevent dust from collecting on the color wheel 21.

In this embodiment, the wheel bracket 121 and the cooling bracket 122 are made of resin. Consequently, it is possible to manufacture the wheel bracket 121 and the cooling bracket 122 by injection molding, and it is possible to manufacture the high-precision wheel bracket 121 and the high-precision cooling bracket 122 at low cost. By using the cooling bracket 122, it is possible to mount the cooling device 123 on the cooling bracket 122 at other place without obstacles. As a result, it is possible to attach the cooling device easily. The cooling device 123 can make contact with the color motor 21a only by positioning and mounting the cooling bracket 122 on the wheel bracket 121. Consequently, it is possible to install the cooling device 123 compared to the case, for example, that the cooling device 123 is mounted with making contact with the color motor 21a passing the cooling device 123 through the through-hole for cooling 121d of the wheel bracket 121. The cooling device 123 can make contact with the lighting bracket 26 only by mounting the wheel bracket 121 on the lighting bracket 26. As described above, by adopting the wheel bracket 121 and the cooling bracket 122, it is possible to install the configuration easily and provide reasonable apparatuses.

Next, airflow inside the image projector 1 in this embodiment is described below.

Figure 23:
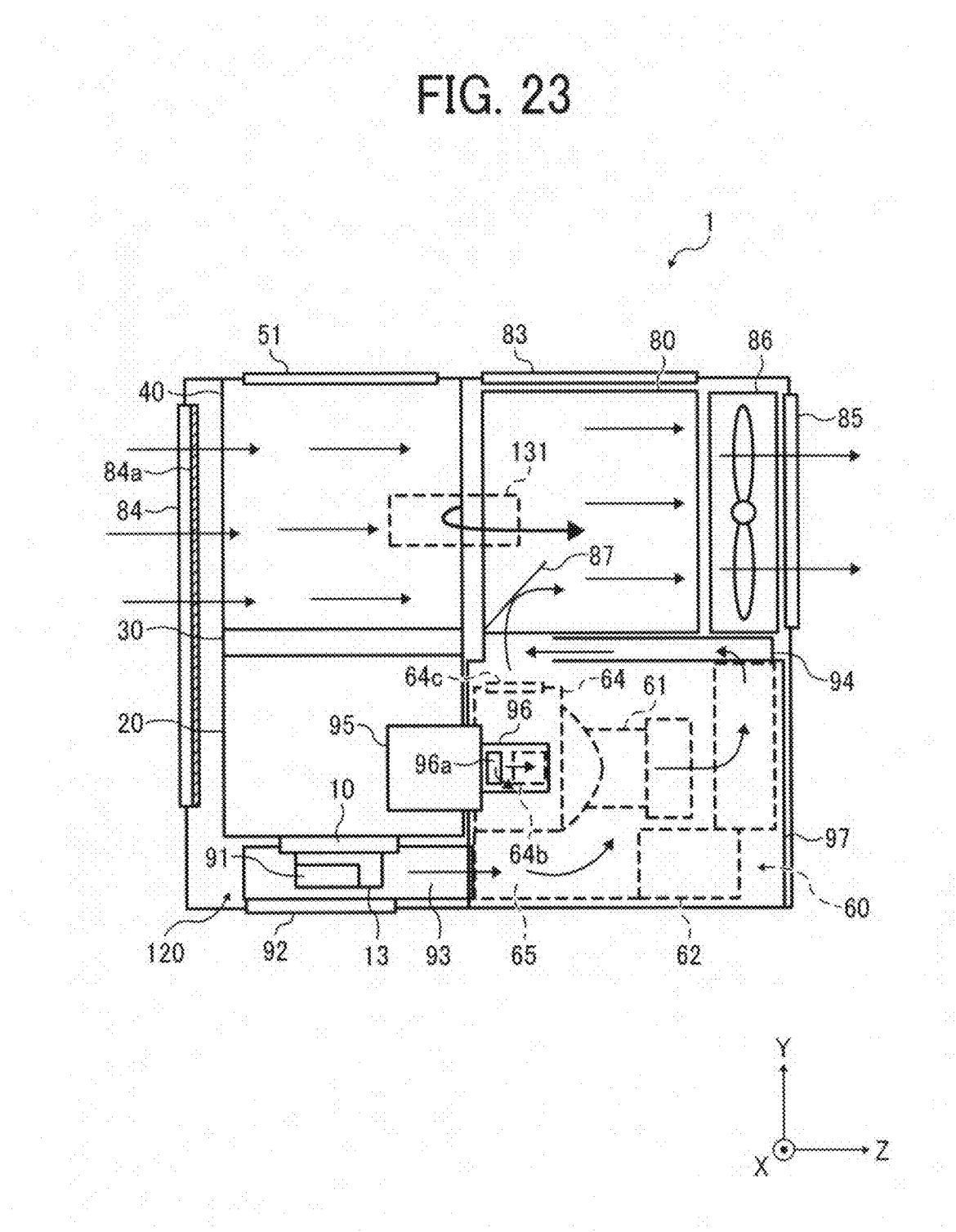
FIG. 23 is a diagram illustrating airflow in the image projector as an embodiment of the present invention.

FIG. 23 is a diagram illustrating airflow in the image projector 1 in this embodiment. FIG. 23 illustrates the image projector 1 viewed from a direction perpendicular to the projection surface 2 (x direction).

As shown in FIG. 23, an opening first intake duct 84 to take outside air in the image projector 1 is placed on one side surface of the image projector 1 (left side in FIG. 23). The first intake duct 84 includes a rustproof filter 84a. An opening exhaust vent 85 to exhaust inside air of the image projector 1 is placed on the other side surface of the image projector 1 (right side in FIG. 23). An exhaust fan 86 is placed opposite to the exhaust vent 85. As shown in FIG. 13, a second intake duct 131 is placed on the side surface of the exterior cover 59 opposed to the curved mirror 42.

In case of viewing the image projector 1 viewed from the direction perpendicular to the projection surface 2 (x direction), the exhaust vent 85, a part of the first intake duct 84, and the second intake duct 131 are placed so that they are located between the light source unit 60 and the control panel 83. The outside air taken in from the first intake duct 84 flows on the z-y plain of the mirror holder 45 in the second projection optical system 40 and the backside of the curved mirror 42 and moves toward the exhaust vent 85 alongside of the mirror holder 45 and the backside of the curved mirror 42. A power supply 80 placed above the light source unit 60 is U-shaped opening the side of the light source unit 60 laying three circuit boards out. The air moves toward the exhaust vent 85 circulating alongside of the mirror holder 45 and the backside of the curved mirror 42 flows into the space surrounded by the power supply 80, and the air is exhausted through the exhaust vent 85.

Figure 24:
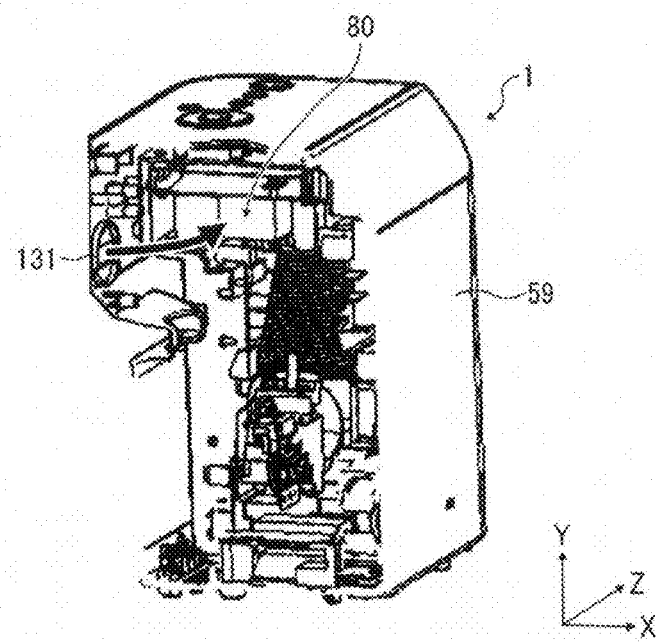
FIG. 24 is a perspective diagram illustrating flow of outside air taken through a second intake duct.

As shown in FIG. 24, the outside air taken through the second intake duct 131 also flows into the space surrounded by the power supply 80 opening the side of the light source unit 60, and the outside air taken through the second intake duct 131 is exhausted through the exhaust vent 85.

By laying the exhaust vent 85, the first intake duct 84, and the second intake duct 131 between the light source unit 60 and the control panel 83 in case of viewing the image projector 1 viewed from the direction perpendicular to the projection surface 2, it is possible to generate airstream that goes between the light source unit 60 and the control panel 83 and is exhausted through the exhaust vent 85.

A light source blower 95 is placed around the light source unit 60. The air taken in by the light source blower 95 flows through the light source duct 96 and flows into a light source intake duct 64b (shown in FIG. 4) of the holder 64. Part of air that flows into the light source duct 96 flows between the light source housing 97 and the exterior cover 59 through an opening 96a formed on the light source duct 96 opposed to the exterior cover 59 (shown in FIG. 13).

The air that flows in between the light source housing 97 and the exterior cover 59 through the opening 96a of the light source duct 96 cools the light source housing 97 and the exterior cover 59, and the air is exhausted through the exhaust vent 85 by the exhaust fan 86.

The air that flows to the light source intake duct 64b flows in the light source 61, cools the light source 61, exhausted through the light source exhaust vent 64c placed on the upper surface of the holder 64. After being exhausted through the light source exhaust vent 64c, the air is exhausted to the space surrounded by the power supply 80 through the opening on the upper surface of the light source housing 97. Subsequently, after being mixed with low-temperature air flows into the space surrounded by the power supply 80 through the first intake duct and the second intake duct, the air is exhausted through the exhaust vent 85 by the exhaust fan 86. As described above, by exhausting the high-temperature air exhausted through the light source exhaust vent 64c after mixing with the outside air, it is possible to prevent the air exhausted through the exhaust vent 85 from being high-temperature.

It is favorable that the control panel 83 is placed on the upper surface of the apparatus for ease of use. However, in this embodiment, the dustproof glass window 51 to project images on the projection surface 2 is placed on the upper surface of the image projector 1, and it is necessary to lay out the control panel 83 on the position overlapping with the light source 61 in case of viewing the image projector 1 from the y direction.

In this embodiment, since the high-temperature air that cools the light source 61 is exhausted toward the exhaust vent 85 by using the airstream that flows from the first intake duct 84 and the second intake duct 131 toward the exhaust vent 85 through between the light source unit 60 and the control panel 83, it is possible to prevent the high-temperature air from moving toward the control panel 83. Consequently, it is possible to prevent the control panel 83 from being high-temperature by the high-temperature air after cooling the light source 61. In addition, part of air that flows from the first intake duct 84 and the second intake duct 131 toward the exhaust vent 85 circumventing the second projection optical system 40 goes just beneath the control panel 83 and cools the control panel 83. That also prevents the control panel 83 from being hot.

A cooling unit 120 that cools the heat sink 13 of the light modulator 10 and the light source bracket 62 of the light source unit 60 etc. is placed in the lower left side of the main body of the apparatus in FIG. 23. The cooling unit 120 includes an intake blower 91 and a horizontal duct 93.

Figure 25:
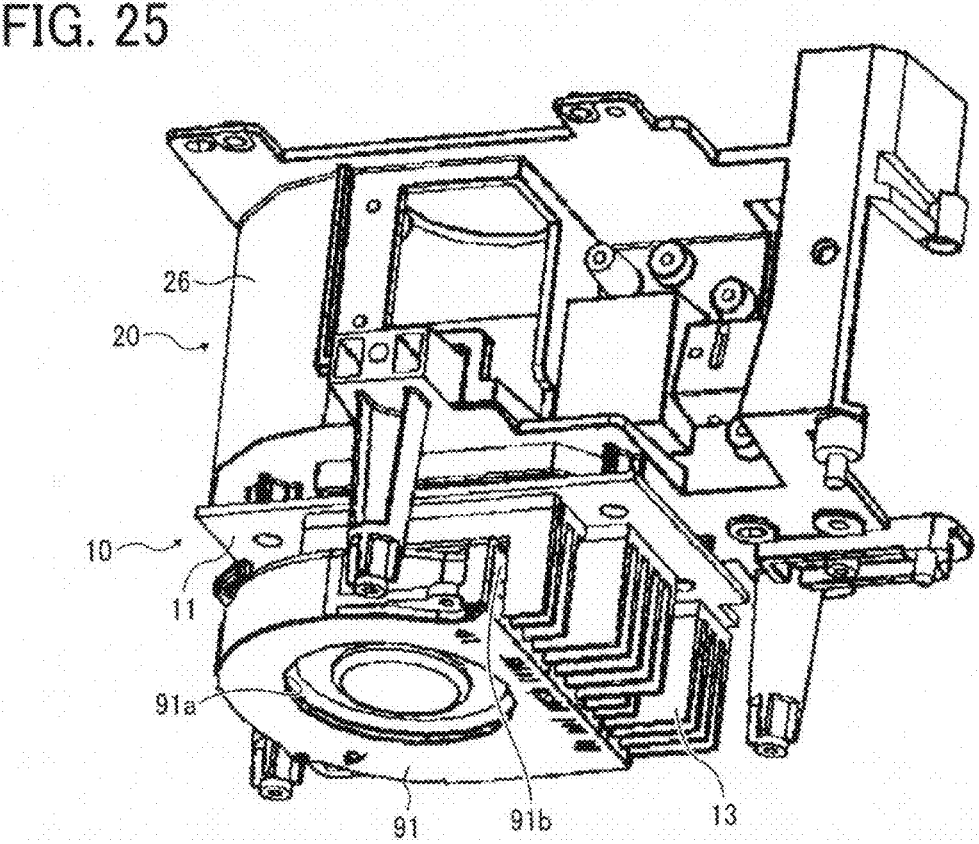
FIG. 25 is a perspective diagram illustrating the light modulator, the lighting unit, and an intake blower.

As shown in FIG. 25, the intake blower 91 is a double-sided intake sirocco fan. The intake blower 91 is mounted on the light modulator 10 so that the blower intake duct 91a on the base part side of the intake blower 91 is opposed to the first intake duct 92 located on the base part 53 opposed to the DMD 12 on the case of the image projector. The opposite side of the blower intake duct 91*a* on the base part side of the intake blower 91 is also the intake duct. However, air-intake of the blower intake duct 91*a* on the base part side is larger. The heat sink 13 consists of a first fin part whose height of the fin is predetermined and a second fin part whose height of the fin is taller than the first fin part. The intake blower 91 is mounted on the first fin part so that the blower exhaust vent 91*b* of the intake blower 91 is opposed to the second fin part of the heat sink 13. By adopting the double-sided intake sirocco fan for the intake blower 91, it is possible to cool the first fin part of the heat sink 13 effectively.

As shown in FIG. 23, the horizontal duct 93 is opened a part of its upper surface and the lower surface. The horizontal duct 93 is mounted on the base part 53 in the image projector 1 so that the opening duct of the lower surface of the horizontal duct 93 is opposed to the first intake duct 92 placed on the base part 53. In addition, the light modulator 10 is mounted on the horizontal duct 93 so that the heat sink 13 in the light modulator 10 and the intake blower 91 mounted on the light modulator 10 go through the opening duct on the lower surface of the horizontal duct 93.

The intake blower 91 takes the outside air in through the blower intake duct 91*a* on the base part side via the first intake duct 92. The intake blower 91 exhausts the outside air that the intake blower 91 takes in to the second fin part of the heat sink through the blower exhaust vent 91*b*. Consequently, the second fin part of the heat sink 13 is air-cooled. By air-cooling the second fin part of the heat sink 13, it is possible to cool the DMD 12 effectively and prevent the DMD 12 from being high-temperature.

As shown in FIG. 23, the airstream is generated by the intake blower 91, after going through the heat sink 13, the air moves through the horizontal duct 93 and flows into the through part 65 or the opening duct 65*a* located on the light source bracket 62 in the light source unit 60 shown in FIG. 5. After circulating into the opening duct 65*a*, the air circulates between the movable cover 54 and the light source bracket 62 and cools the movable cover 54.

By contrast, after circulating into the through part 65, the air cools the light source bracket 62. Subsequently, the air flows into the part opposed to the emitting side of the light source 61 and cools the reflector of the light source 61 by cooling the opposite side of the reflecting surface of the reflector in the light source 61. Consequently, the air that goes through the through part 65 draws heat from both the light source bracket 62 and the light source 61. After going through near the reflector, the air goes through the exhaust duct 94 that directs the air from the height of the light source bracket 62 to the height of the lower part around the exhaust fan 86 mixed with the air exhausted from the light source exhaust vent 64*c*, and exhausted through the exhaust vent 85 by the exhaust fan 86. After cooling the movable cover 54, the air that circulates between the movable cover 54 and the light source bracket 62 through the opening duct 65*a* moves through inside the apparatus, and the air is exhausted through the exhaust vent 85 by the exhaust fan 86.

In the image projector in this embodiment, the second intake duct 131 is placed near the power supply unit 80, and the first intake duct includes the dustproof filter 84*a*. As described above, by laying the second intake duct 131 out, it is possible to take outside air in actively through the second intake duct 131 by the exhaust fan 86. Since the first intake duct 84 includes the dustproof filter 84*a*, the dustproof filter 84*a* intercepts the airflow, and that results in reducing the amount of the outside air taken through the first intake duct 84. As a result, in this embodiment, the ratio between the outside air taken through the second intake duct 131 and the outside air taken through the first intake duct 84 is 70% to 30%, and the amount of the outside air taken through the second intake duct 131 is larger than the amount of the outside air taken through the first intake duct 84. The moving distance toward the power supply unit 80 inside the apparatus of the outside air taken through the second intake duct 131 is shorter than the outside air taken through the first intake duct 84. As a result, it is possible to prevent the outside air taken through the second intake duct 131 from increasing its temperature due to the heat inside the apparatus compared to the outside air taken through the first intake duct 84. Consequently, it is possible to flow low-temperature outside air toward the power supply unit 80 compared to the case in which the outside air is flowed toward the power supply unit 80 through the first intake duct 84. Furthermore, the amount of the outside air that flows from the second intake duct 131 to the power supply unit 80 is larger than the outside air that flows from the first intake duct 84 to the power supply unit 80. Therefore, it is possible to cool the power supply unit 80 favorably. As a result, in order to increase the brightness of the projection images, in case of increasing the supplied power to the light source 61 and increasing the heating value of the power supply unit 80 and the light source 61, it is possible to cool the power supply unit 80 favorably. In addition, it is possible to cool the power supply unit 80 without increasing the speed of the exhaust fan 86 to increase the amount of air flown toward the power supply unit 80, and that results in reducing wind noise of the exhaust fan 86.

In addition, the outside air taken through the first intake duct 84 flows in the apparatus through the dustproof filter 84*a*. Therefore, the outside air taken through the first intake duct 84 does not almost include dust. Consequently, even if part of the outside air taken through the first intake duct 84 flows in the second projection optical system 40 through the gap between the lower part of the curved mirror 42 and the lens holder 32, it is possible to suppress dust from collecting on the curved mirror 42 and the reflecting mirror 41. As a result, it is possible to keep projecting high-quality images on the projection surface 2 for a long time.

The second intake duct 131 is placed opposed to around the center in the y direction at the backside of the curved mirror. Therefore, it is possible to prevent the outside air taken through the second intake duct 131 from circulating in the second projection optical system 40 through the gap between the lower part of the curved mirror 42 and the lens holder 32 and the gap between the upper part of the curved mirror 42 and the connecting part 44*b* of the free mirror bracket 44. Consequently, it is possible to prevent dust included in the outside air taken through the second intake duct 131 from attaching to the curved mirror 42 and the reflecting mirror 41.

In this embodiment, an intake duct for cooling DMD 92 is placed on the base part 53 opposite to the DMD 12 on the case of the image projector 1. Consequently, the outside air taken through the intake duct for cooling DMD 92 flows in the DMD 12 directly. As a result, it is possible to cool the DMD 12 without being warmed by the heat inside the apparatus compared to the case in which the outside air is flown to the DMD 12 via a duct.

Figure 26:
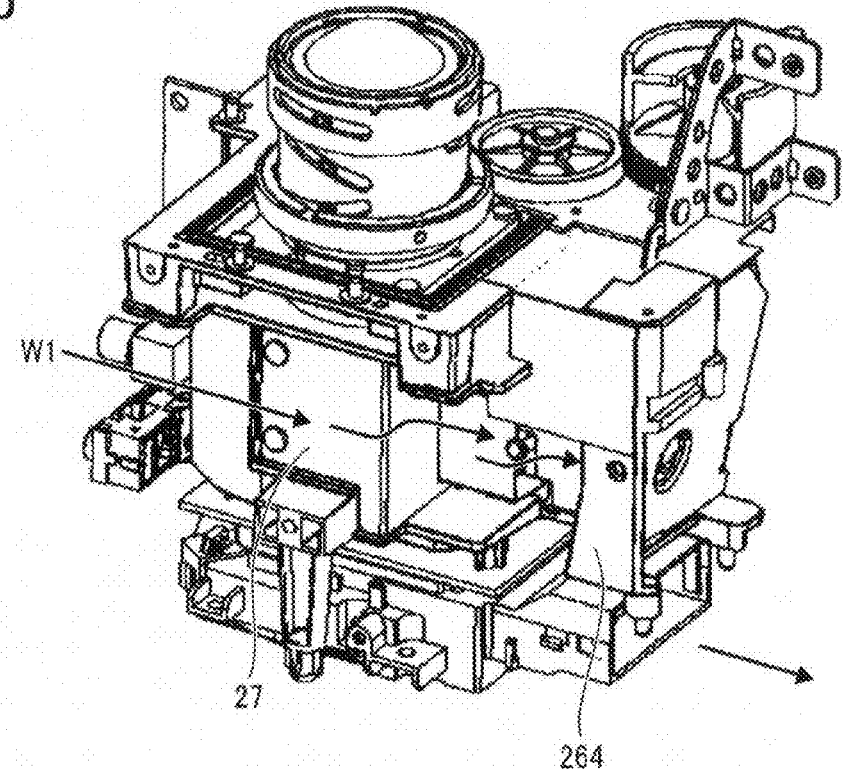
FIG. 26 is a diagram illustrating airflow around the conventional lighting bracket.
Figure 27:
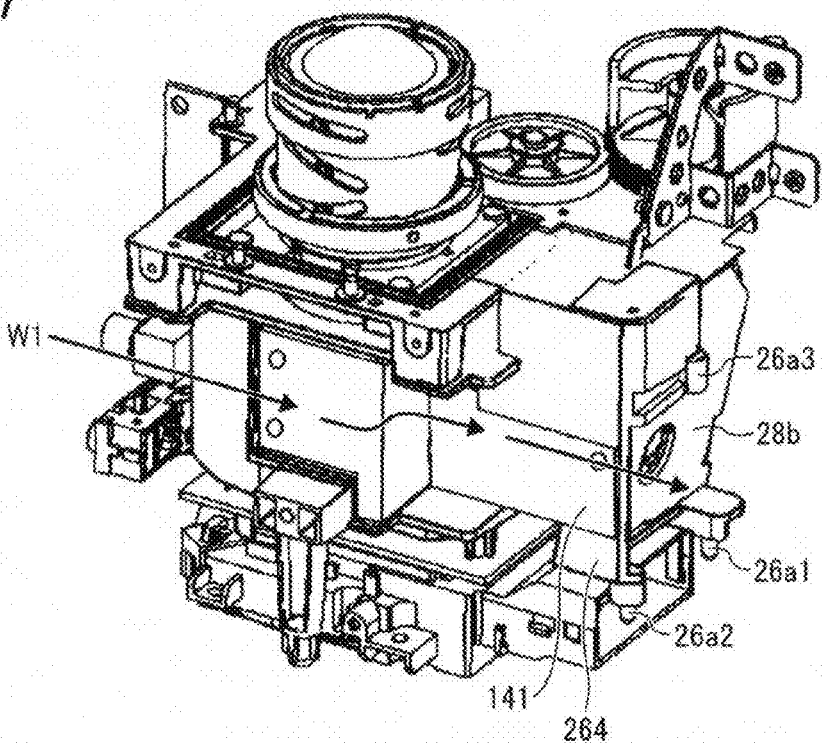
FIG. 27 is a diagram illustrating airflow around the lighting bracket as an embodiment of the present invention.

As shown in FIG. 26, part of the outside air taken through the first intake duct 84 moves alongside of the lighting bracket 26 as shown by arrow W1 in FIG. 26. The outside air that flows along the lighting bracket 26 could move to the color wheel 21 through a gap S between the lighting bracket 26 and the wheel bracket shown in FIG. 22. To cope with this issue, in this embodiment, as shown in FIG. 27, a windproof part 141 is mounted on the lighting bracket 26. The windproof part 141 is formed by folding and processing a steel plate, and one end of the windproof part 141 is mounted on the lighting bracket 26 by a screw that screws the off light board 27 to the lighting bracket 26. The other end of the windproof part 141 is screwed on a column part 264 of the lighting bracket 26 on which the light source positioned parts 26a1, 26a2, and 26a3 are formed.

As described above, by laying the windproof part 141 out, the air that has moved alongside of the lighting bracket 26 moves toward the light source unit 60 side without circulating in the gap S between the lighting bracket 26 and the wheel bracket 121 shown in FIG. 22. Consequently, it is possible to prevent air from circulating in the color wheel 21, and it is possible to prevent dust from collecting on the color wheel 21.

In the present invention, described above is an example, and advantageous effects specific to each of following embodiments are performed.

First Embodiment

In the lighting unit such as the lighting unit 20 that includes the color wheel 21 that separates the illuminating light from the light source 61 into different colors by rotating time-divisionally, the drive source that drives the color wheel 21 such as the color motor 21a, and the optical unit to illuminate the light that goes through the color wheel 21 on the image generating device such as the DMD 12 that generates the projection images, the drive source includes the cooling device 123 that draws heat from the drive source to cool the drive source.

In the first embodiment, by cooling the drive source by drawing heat from the drive source such as the color motor 21a by the cooling device 123, it is possible to prevent the drive source from being high-temperature. In addition, it is possible to transfer dust near the color wheel 21 compared to the case that the drive source is cooled by circulating air to the drive source. Consequently, it is possible to prevent dust from collecting on the color wheel 21.

Second Embodiment

In the first embodiment, the cooling device 123 contacts the holder that is made of metal material and holds the optical devices such as the lighting bracket 26.

With the configuration described above, it is possible to radiate the heat of the color motor 21a effectively compared to the case that only the cooling device 123 radiates the heat. Consequently, it is possible to enhance the cooling efficiency of the cooling device 123, and it is further possible to prevent the drive source such as the color motor 21a from becoming high-temperature.

Third Embodiment

In the first embodiment or the second embodiment, the bracket such as the wheel bracket 121 that holds the drive source such as the color motor 21a is included, and the cooling device 123 is made of material with the heat conductivity higher than the bracket.

With the configuration described above, it is possible to draw heat from the drive source such as the color motor 21a favorably.

Fourth Embodiment

In the first embodiment, the second embodiment, or the third embodiment, the cooling bracket 122 that holds the cooling device 123 and is mounted on the bracket that holds the drive source such as the color motor 21a is included.

With the configuration described above, it is possible to install the cooling device 123 so that the cooling device 123 can easily make contact with the drive source and the lighting bracket 26, and that results in improving easiness of assembling as described before.

Fifth Embodiment

In the first embodiment, the second embodiment, the third embodiment, or the fourth embodiment, the elastic material is used for the cooling device 123.

With the configuration described above, it is possible that the cooling device 123 can be attached firmly to the drive source such as the color motor 21a by transforming the cooling device 123 elastically as described before. Consequently, it is possible to draw heat from the drive source by the cooling device 123, and it is possible to cool the drive source favorably.

Sixth Embodiment

In the image projector such as the image projector 1 that includes the light source 61 and the lighting unit 20 that illuminates the light from the light source 61 on the image generating device such as the DMD 12 that generates the projection images and projects the projection images generated by the image generating device, the lighting unit described in the first embodiment, the second embodiment, the third embodiment, the fourth embodiment, or the fifth embodiment is used as the lighting unit.

With the configuration described above, it is possible to rotate the color wheel 21 stably, and it is possible to acquire the favorable projection images as described before.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A lighting unit, comprising:
a color wheel to time-divide light from a light source into different colors;
a motor to drive the color wheel;
a cooling device that contacts the motor and draws heat from the motor to cool the motor;
an optical device to direct light that passes through the color wheel onto an image generating device that generates a projection image; and
a metal holder that holds the optical device,
wherein the cooling device contacts the holder.

2. The lighting unit according to claim 1, further comprising:
a bracket to hold the motor,
wherein the cooling device is constructed of a material having a higher heat conductivity than the heat conductivity of the bracket.

3. The lighting unit according to claim 2, further comprising:
a cooling bracket to hold the cooling device, mounted on the bracket that holds the motor.

4. The lighting unit according to claim 1, wherein the cooling device comprises an elastic material.

5. An image projector, comprising:
a lighting source; and
the lighting unit according to claim 1, to direct light from the lighting source onto the image generating device that generates the projection image.

* * * * *